US011080906B2

(12) United States Patent
Garvey et al.

(10) Patent No.: US 11,080,906 B2
(45) Date of Patent: *Aug. 3, 2021

(54) METHOD FOR CREATING PERIOD PROFILE FOR TIME-SERIES DATA WITH RECURRENT PATTERNS

(71) Applicant: Oracle International Corporation, Redwood Shores, CA (US)

(72) Inventors: Dustin Garvey, Oakland, CA (US); Uri Shaft, Fremont, CA (US); Lik Wong, Palo Alto, CA (US); Maria Kaval, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,050

(22) Filed: Apr. 27, 2020

(65) Prior Publication Data

US 2020/0327708 A1    Oct. 15, 2020

Related U.S. Application Data

(63) Continuation of application No. 16/144,831, filed on Sep. 27, 2018, now Pat. No. 10,692,255, which is a
(Continued)

(51) Int. Cl.
*G06T 11/20* (2006.01)
*G06Q 30/02* (2012.01)
(Continued)

(52) U.S. Cl.
CPC ........ *G06T 11/206* (2013.01); *G06F 11/3452* (2013.01); *G06F 17/18* (2013.01);
(Continued)

(58) Field of Classification Search
CPC .. G06T 11/206; G06T 11/001; G06F 11/3452; G06F 17/18; G06F 21/55;
(Continued)

(56) References Cited

U.S. PATENT DOCUMENTS 6,298,063 B1   10/2001  Coile et al.
6,438,592 B1    8/2002  Killian
(Continued)

FOREIGN PATENT DOCUMENTS

CN      105426411 A     3/2016
CN      109359763 A     2/2019
(Continued)

OTHER PUBLICATIONS

Lehmann, "Variability of Atmospheric Circulation Patterns Associated With Large Volume Changes of the Baltic Sea", Adv. Sci. Res., 12, 219-225, 2015, www.adv-sci-res.net/12/219/2015/ DOI: 10.5.194/ASR-12-219-2015 (Year: 2015).*
(Continued)

*Primary Examiner* — Maurice L. McDowell, Jr.
(74) *Attorney, Agent, or Firm* — Invoke

(57) ABSTRACT

Techniques are described for generating period profiles. According to an embodiment, a set of time series data is received, where the set of time series data includes data spanning a plurality of time windows having a seasonal period. Based at least in part on the set of time-series data, a first set of sub-periods of the seasonal period is associated with a particular class of seasonal pattern. A profile for a seasonal period that identifies which sub-periods of the seasonal period are associated with the particular class of seasonal pattern is generated and stored, in volatile or non-volatile storage. Based on the profile, a visualization is generated for at least one sub-period of the first set of sub-periods of the seasonal period that indicates that the at
(Continued)

least one sub-period is part of the particular class of seasonal pattern.

20 Claims, 17 Drawing Sheets

Related U.S. Application Data continuation of application No. 15/445,763, filed on Feb. 28, 2017, now Pat. No. 10,127,695.

(60) Provisional application No. 62/301,585, filed on Feb. 29, 2016, provisional application No. 62/301,590, filed on Feb. 29, 2016.

(51) Int. Cl.

| | |
|---|---|
| *G06N 20/00* | (2019.01) |
| *G06Q 10/04* | (2012.01) |
| *G06F 17/18* | (2006.01) |
| *G06F 21/55* | (2013.01) |
| *G06Q 10/06* | (2012.01) |
| *G06K 9/00* | (2006.01) |
| *G06K 9/62* | (2006.01) |
| *G06F 11/34* | (2006.01) |
| *G06Q 10/10* | (2012.01) |
| *G06T 11/00* | (2006.01) |
| *H04L 12/24* | (2006.01) |
| *G06F 9/50* | (2006.01) |

(52) U.S. Cl.
CPC .......... *G06F 21/55* (2013.01); *G06K 9/00536* (2013.01); *G06K 9/628* (2013.01); *G06N 20/00* (2019.01); *G06Q 10/04* (2013.01); *G06Q 10/06* (2013.01); *G06Q 10/0631* (2013.01); *G06Q 10/1093* (2013.01); *G06Q 30/0202* (2013.01); *G06T 11/001* (2013.01); *G06F 9/505* (2013.01); *G06Q 10/06315* (2013.01); *H04L 41/0896* (2013.01)

(58) Field of Classification Search
CPC ........ G06F 9/505; G06Q 10/04; G06Q 10/06; G06Q 10/0631; G06Q 10/1093; G06Q 30/0202; G06Q 10/06315; G06K 9/00536; G06K 9/628; G06N 20/00; H04L 41/0896

See application file for complete search history.

(56) References Cited

U.S. PATENT DOCUMENTS

| | | |
|---|---|---|
| 6,597,777 B1 | 7/2003 | Ho |
| 6,643,613 B2 | 11/2003 | McGee et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,916 B2 | 5/2017 | Yoshinaga et al. |
| 9,692,662 B2 | 6/2017 | Chan |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,210,036 B2 | 2/2019 | Iyer et al. |
| 10,331,802 B2 | 6/2019 | Garvey et al. |
| 10,692,255 B2 * | 6/2020 | Garvey ................. G06N 20/00 |
| 10,699,211 B2 | 6/2020 | Garvey et al. |
| 10,885,461 B2 | 1/2021 | Garvey et al. |
| 10,915,830 B2 | 2/2021 | Garvey et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0106743 A1 | 5/2006 | Horvitz |
| 2006/0106797 A1 | 5/2006 | Srinivasa et al. |
| 2006/0161485 A1 | 7/2006 | Meldahl |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0024427 A1 | 1/2009 | Shan |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |

(56) References Cited

U.S. PATENT DOCUMENTS

| | | |
|---|---|---|
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0024173 A1 | 1/2013 | Brzezicki et al. |
| 2013/0080374 A1 | 3/2013 | Karlsson |
| 2013/0151179 A1 | 6/2013 | Gray |
| 2013/0226320 A1 | 8/2013 | Berg-Sonne et al. |
| 2013/0282891 A1 | 10/2013 | Davis et al. |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |
| 2015/0317589 A1 | 11/2015 | Anderson et al. |
| 2015/0371144 A1 | 12/2015 | Engle |
| 2016/0034328 A1 | 2/2016 | Poola et al. |
| 2016/0042289 A1 | 2/2016 | Poola et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0061321 A1 | 3/2017 | Maiya et al. |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0329660 A1 | 11/2017 | Salunke et al. |
| 2017/0351563 A1 | 12/2017 | Miki et al. |
| 2017/0364851 A1 | 12/2017 | Maheshwari et al. |
| 2018/0026907 A1 | 1/2018 | Miller et al. |
| 2018/0039555 A1 | 2/2018 | Salunke et al. |
| 2018/0052804 A1 | 2/2018 | Mikami et al. |
| 2018/0053207 A1 | 2/2018 | Modani et al. |
| 2018/0059628 A1 | 3/2018 | Yoshida |
| 2018/0081629 A1 | 3/2018 | Kuhhirte et al. |
| 2018/0219889 A1 | 8/2018 | Oliner et al. |
| 2018/0268152 A1 | 9/2018 | Cuomo et al. |
| 2018/0321989 A1 | 11/2018 | Shetty et al. |
| 2018/0324199 A1 | 11/2018 | Crotinger et al. |
| 2018/0330433 A1 | 11/2018 | Frenzel et al. |
| 2018/0349797 A1 | 12/2018 | Garvey et al. |
| 2018/0351786 A1 | 12/2018 | Pope et al. |
| 2019/0042982 A1 | 2/2019 | Qu et al. |
| 2019/0065275 A1 | 2/2019 | Wong et al. |
| 2019/0305876 A1 | 10/2019 | Sundaresan et al. |
| 2020/0034745 A1 | 1/2020 | Nagpal et al. |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Toreti, "A Novel Approach for the Detection of Inhomogeneities Affecting Climate Time Series", Journal of Applied Meteorology and Climatology, vol. 51, Feb. 2012, DOI: 10.1175/JAMC-D-10-05033.1 (Year: 2012).*

Zhai, "Spatial Variation and Trends in PDSI and SPI Indices and Their Relation To Streamflow in 10 Large Regions of China", 2010, Journal of Climate, vol. 23, 2010 American Meteorological Society, DOI: 10.1175/2009JCLI2968.1 (Year: 2010).*

Time Series Pattern Search: A tool to extract events from time series data, available online at <https://www.ceadar.ie/pages/time-series-pattern-search/>, retrieved on Apr. 24, 2020, 4 pages.

Yin, "System resource utilization analysis and prediction for cloud based applications under bursty workloads," 2014, Information Sciences, vol. 279, pp. 338-357 (Year: 2014).

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

Ahmed, Reservoir-based network traffic stream summarization for anomaly detection, Article in Pattern Analysis and Applications, Oct. 2017.

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Charapko, Gorilla—Facebook's Cache for Time Series Data, http://charap.co/gorilla-facebooks-cache-for-monitoring-data/, Jan. 11, 2017.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Davies, David L., et al., "A Cluster Separation measure", IEEE Transactions on Pattern Analysis and Machine Intelligence, vol. PAMI-1, No. 2, Apr. 1979, pp. 224-227.

Dunning et al., Computing Extremely Accurate Quantiles Using t-Digests.

Faraz Rasheed, "A Framework for Periodic Outlier Pattern Detection in Time-Series Sequences," May 2014, IEEE.

Greenwald et al. "Space-efficient online computation of quantile summaries." ACM Proceedings of the 2001 SIGMOD international conference on Management of data pp. 58-66.

(56) References Cited

OTHER PUBLICATIONS

Greunen, "Forecasting Methods for Cloud Hosted Resources, a comparison," 2015, 11th International Conference on Network and Service Management (CNSM), pp. 29-35 (Year 2015).
Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.
Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.
Hao et al., Visual Analytics of Anomaly Detection in Large Data Streams, Proc. SPIE 7243, Visualization and Data Analysis 2009, 10 pages.
Haugen et al., "Extracting Common Time Trends from Concurrent Time Series: Maximum Autocorrelation Factors with Applications", Stanford University, Oct. 20, 2015, pp. 1-38.
Herbst, "Self-adaptive workload classification and forecasting for proactive resource provisioning", 2014, ICPE'13, pp. 187-198 (Year 2014).
Jarvis, R. A., et al., "Clustering Using a Similarity Measure Based on Shared Neighbors", IEEE Transactions on Computers, vol. C-22, No. 11, Nov. 1973, pp. 1025-1034.
Lin, Xuemin, et al. "Continuously maintaining quantile summaries of the most recent n elements over a data stream." IEEE, 2004.
Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).
NPL: Web document dated Feb. 3, 2011, Title: OpenStack Compute, Admin Manual.
Nurmi D et al: "The Eucalyptus Open-Source Cloud-Computing System", Cluster Computing and the GRID, 2009. CCGRID '09. 9th IEEE/ACM International Symposium on, IEEE, Piscataway, NJ, USA, May 18, 2009 (May 18, 2009), pp. 124-131.
Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.
Slipetskyy, Rostyslav, "Security Issues in OpenStack", Master's Thesis, Technical University of Denmark, Jun. 2011, 90 pages.
Somlo, Gabriel, et al., "Incremental Clustering for Profile Maintenance in Information Gathering Web Agents", Agents '01, Montreal, Quebec, Canada, May 28-Jun. 1, 2001, pp. 262-269.
Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.
Taylor J W et al: "Forecasting intraday time series with multiple seasonal cycles using parsimonious seasonal exponential smoothing", Omega, vol. 40, No. 6, Dec. 2012 (Dec. 2012), pp. 748-757.
Voras et al.,"Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.
Voras I et al: "Evaluating open-source cloud computing solutions", MIPRO, 2011 Proceedings of the 34th International Convention, IEEE, May 23, 2011 (May 23, 2011), pp. 209-214.
Wilks, Samuel S. "Determination of sample sizes for setting tolerance limits." The Annals of Mathematical Statistics 12.1 (1941): 91-96.
Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].
Yokoyama, Tetsuya, "Windows Server 2008, Certification Test, Part 5: Reliability", Apr. 15, 2008, pp. 124-125 along with 4 pages of English Translation.
Jain and Chlamtac, P-Square Algorithm for Dynamic Calculation of Quantiles and Histograms Without Storing Observations, ACM, Oct. 1985 (10 pages).
Suntinger, "Trend-based similarity search in time-series data," 2010, Second International Conference on Advances in Databases, Knowledge, and Data Applications, IEEE, pp. 97-106 (Year: 2010).
Li et al., "Forecasting Web Page Views: Methods and Observations," in 9 J. Machine Learning Res. 2217-50 (2008). (Year 2008).

\* cited by examiner

| Selected Hours | |
|---|---|
| Monday 21 | Thursday 4 |
| Monday 22 | Thursday 5 |
| Monday 23 | Thursday 6 |
| Tuesday 0 | Thursday 7 |
| Tuesday 1 | Thursday 8 |
| Tuesday 2 | Thursday 20 |
| Tuesday 3 | Thursday 21 |
| Tuesday 4 | Thursday 22 |
| Tuesday 5 | Thursday 23 |
| Tuesday 20 | Friday 0 |
| Tuesday 21 | Friday 1 |
| Tuesday 22 | Friday 2 |
| Tuesday 23 | Friday 3 |
| Wednesday 0 | Friday 4 |
| Wednesday 1 | Friday 5 |
| Wednesday 2 | Friday 6 |
| Wednesday 3 | Friday 20 |
| Wednesday 4 | Friday 21 |
| Wednesday 5 | Friday 22 |
| Wednesday 6 | Friday 23 |
| Wednesday 7 | Saturday 0 |
| Wednesday 20 | Saturday 1 |
| Wednesday 21 | Saturday 2 |
| Wednesday 22 | Saturday 3 |
| Wednesday 23 | Saturday 4 |
| Thursday 0 | Saturday 5 |
| Thursday 1 | Saturday 6 |
| Thursday 2 | Saturday 7 |
| Thursday 3 | |

702

| Merged | Homogenized #1 | Homogenized #2 | Seasons |
|---|---|---|---|
| Monday 21-23 | Monday 20-23 | Monday 20-23 | Monday-Friday 20-23 |
| Tuesday 0-5 | Tuesday 0-7 | Tuesday 0-8 | Tuesday-Saturday 0-8 |
| Tuesday 20-23 | Tuesday 20-23 | Tuesday 20-23 | |
| Wednesday 0-7 | Wednesday 0-8 | Wednesday 0-8 | |
| Wednesday 20-23 | Wednesday 20-23 | Wednesday 20-23 | |
| Thursday 0-8 | Thursday 0-8 | Thursday 0-8 | |
| Thursday 20-23 | Thursday 20-23 | Thursday 20-23 | |
| Friday 0-6 | Friday 0-8 | Friday 0-8 | |
| Friday 20-23 | Friday 20-23 | Friday 20-23 | |
| Saturday 0-7 | Saturday 0-8 | Saturday 0-8 | |

METHOD FOR CREATING PERIOD PROFILE FOR TIME-SERIES DATA WITH RECURRENT PATTERNS

INCORPORATION BY REFERENCE; DISCLAIMER

Each of the following applications are hereby incorporated by reference: application Ser. No. 16/144,831 filed on Sep. 27, 2018; application Ser. No. 15/445,763 filed on Feb. 28, 2017; application No. 62/301,585 filed on Feb. 29, 2016; application No. 62/301,590 filed on Feb. 29, 2016. The Applicant hereby rescinds any disclaimer of claim scope in the parent application(s) or the prosecution history thereof and advises the USPTO that the claims in this application may be broader than any claim in the parent application(s).

This application is related to U.S. application Ser. No. 15/266,971, entitled "SEASONAL AWARE METHOD FOR FORECASTING AND CAPACITY PLANNING"; U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; and U.S. Provisional Patent Appl. No. 62/370,880, entitled "UNSUPERVISED METHOD FOR BASELINING AND ANOMALY DETECTION IN TIME-SERIES DATA FOR ENTERPRISE SYSTEMS", the entire contents for each of which are incorporated by reference herein as if set forth in their entirety.

TECHNICAL FIELD

The present disclosure relates to detecting and characterizing seasons within time series data. The disclosure relates more specifically to computer-implemented techniques for identifying instances of a season, associating the instances with different seasonal classes, and generating summaries for the seasonal classes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A time series is a sequence of data points that are typically obtained by capturing measurements from one or more sources over a period of time. As an example, businesses may collect, continuously or over a predetermined time interval, various performance metrics for software and hardware resources that are deployed within a datacenter environment. Analysts frequently apply forecasting models to time series data in an attempt to predict future events based on observed measurements. One such model is the Holt-Winters forecasting algorithm, also referred to as triple exponential smoothing.

The Holt-Winters forecasting algorithm takes into account both trends and seasonality in the time series data in order to formulate a prediction about future values. A trend in this context refers to the tendency of the time series data to increase or decrease over time, and seasonality refers to the tendency of time series data to exhibit behavior that periodically repeats itself. A season generally refers to the period of time before an exhibited behavior begins to repeat itself. The additive seasonal model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + k\, T_t + S_{t+k-p} \quad (4)$$

where $F_{t+k}$ denotes the forecast at future time t+k.

The additive seasonal model is typically applied when seasonal fluctuations are independent of the overall level of the time series data. An alternative, referred to as the multiplicative model, is often applied if the size of seasonal fluctuations vary based on the overall level of the time series data. The multiplicative model is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index at time t, respectively. The forecast is then given by the following formula:

$$F_{t+k} = (L_t + k\, T_t)\, S_{t+k-p} \quad (8)$$

Predictive models such as triple exponential smoothing are primarily focused on generating forecasts about future events. While the Holt-Winter additive and multiplicative models take into account seasonal indices to generate the forecast, these models provide limited information on any seasonal patterns that may exist in the time series data. In particular, the seasonal indices represented by equations (3) and (7) are typically implemented as internal structures that operate within the bounds of the forecasting models to which they are tied. As a result, the seasonal data output by these formulas does not lend itself to meaningful interpretation in contexts outside of the specific forecasting models for which the seasonal data was generated. Further, the end user may have little or no underlying notion of any seasonal data that was used in generating a forecast.

BRIEF DESCRIPTION OF THE DRAWINGS

Various embodiments are illustrated by way of example, and not by way of limitation, in the figures of the accompanying drawings and in which like reference numerals refer to similar elements and in which:

FIG. 7 illustrates an example summary obtained through generating and homogenizing a set of segments based on a set of classified instances;

DETAILED DESCRIPTION

Figure 1:
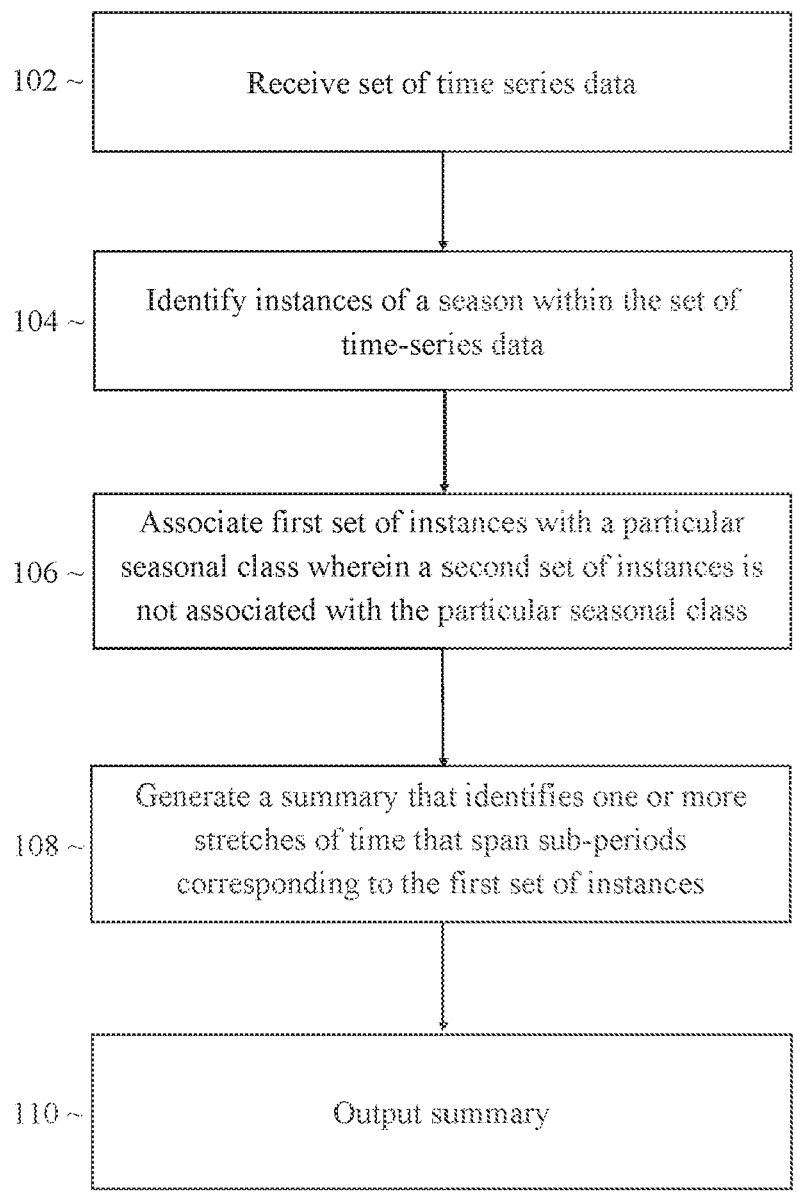
FIG. 1 illustrates an example process for detecting and summarizing characteristics of seasonal patterns extrapolated from time series data.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

In various embodiments, computer systems, stored instructions, and technical steps are described for detecting and characterizing seasonal patterns within a time series. Seasonal patterns may be detected by analyzing data points collected across different seasonal periods (also referred to herein as "samples") within the time series. If the analysis detects values within a time series that recur on a seasonal basis, then a seasonal pattern is detected. If a seasonal pattern is detected, then the data points are further analyzed to classify the seasonal pattern. For instance, the data points may be classified as a recurrent high or a recurrent low within the time series. Once classified, a summary may be generated, where the summary identifies one or more classes of seasonal patterns that were detected within the time series. The summary may be displayed, stored, or otherwise output to expose classified seasonal patterns of a time series to an end user or application. A recurrent patterns in this context refers to a value, trend, or other characteristics that repeats between multiple instances and/or over multiples sample periods of a season. Recurrent patterns may or may not involve a detected pattern with respect to the trend in the overall magnitude of a signal. For instance, a recurrent pattern may represent a trend in "high" or "low" with respect to the dense signal. A recurrent pattern may allow for a lateral shift, for example up to a threshold amount in terms of time, such that the sparse data points feeding into a sparse pattern may not be perfectly aligned period-to-period.

In some embodiments, the techniques for classifying seasonal patterns include preprocessing time series data by segmenting the data into a set of instances, where each instance in the set of instances corresponds to a different respective sub-period within a season. During preprocessing, the set of instances are analyzed to determine which instances should be associated with a particular seasonal class. Different instances within a season may be associated with different respective classes or may remain unclassified. For instance, a first group of instances from the set of instances may be associated with a first class and a second group of instances from the set of instances may be associated with a second class while a third group of instances from the set of instances may remain unclassified. Based on which group of instances are associated with a particular class, a summary may be generated to characterize the seasonal patterns within the time series.

In order to characterize a class of seasonal pattern that may exist in a time series, a summary may identify one or more stretches of time that are associated with the class. As an example, a "weekly high" seasonal class may specify the days and/or hours in which recurrent weekly high patterns were detected. As another example, a "monthly low" seasonal class may identify the weeks, days, and/or hours in which recurrent monthly lows were detected. Other seasonal classes may also be included in the summary to identify and characterize seasonal patterns within a time series. The summary may be integrated programmatically into a variety of complex analytic solutions. In the context of information technology (IT), for example, the summary data may processed to perform seasonal-aware anomaly detection, maintenance planning, hardware and software consolidation, and capacity planning.

A stretch of time for a particular seasonal class may be identified by merging adjacent instances of a season that share the same class. The stretch of time may also be expanded to include adjacent instances that are unclassified. By filling in adjacent, unclassified values, random variations in patterns over different seasonal periods may be reduced, thereby providing consistent results over extended time frames when the underlying patterns do not substantially change.

FIG. 1 illustrates an example process for detecting and summarizing characteristics of seasonal patterns extrapolated from time series data. At block 102, a set of time series data is retrieved or otherwise received by an application executing on one or more computing devices. At block 104, the application identifies a plurality of instances of a season within the set of time series data. As previously mentioned, different instances of a season may correspond to different respective sub-periods within the season. At block 106, the application associates a first set of instances from the plurality of instances of the season with a particular class for characterizing a seasonal pattern. After associating the first set of instances with the seasonal class, a second set of instances from the plurality of instances remains unclassified or otherwise unassociated with the particular class. At block 108, the application generates a summary that identifies one or more stretches of time that belong to the particular class such that the one or more stretches of time span the sub-periods corresponding to the first set of instances and at least one sub-period corresponding to at least one instance in the second set of instances. At block 110, the application outputs the summary for the particular class by performing one or more of storing the summary in non-volatile storage, providing the summary to a separate application, or causing display of the summary to an end user.

In some sets of time series data, sparse patterns may be overlaid on dense patterns or there may only be sparse or dense patterns within the data. The additive and multiplicative Holt-Winter seasonal indices, represented by equations (3) and (7), do not provide a meaningful treatment of both sparse and dense patterns. Generally, the Holt-Winters equations smooth the time series-data such that the sparse components are effectively removed and ignored. Smoothing prevents noise from significantly affecting the seasonal index, relying instead on trends in the dense data to produce forecasts. However, removing the sparse components of a signal may cause meaningful seasonal patterns that are sparse in nature to be overlooked.

In order to account for both dense and sparse patterns, the set of time series data may be decomposed into a dense signal and a noise signal (also referred to herein as a "sparse signal"). By splitting the time series into separate components, an independent analysis may be performed on both the dense signal and the noise signal. This allows the dense and sparse features within the time series data to be considered and classified independently. For example, the noise signal may be analyzed to generate a first classification for a plurality of instances of a season, where the first classification associates a first set of one or more instances from the plurality of instances with a particular class of seasonal pattern. The dense signal may be separately and independently analyzed to generate a second classification that associates a second set of one or more instances with the particular class of seasonal pattern. The first set of one or more instances and the second set of one or more instances may overlap, in that at least one instance may be classified the same in both. One or more instances may be classified differently or remain unclassified between the first and second classifications. The classifications may then be combined to generate a third classification, which may be used to summarize the dense and sparse features of a seasonal class.

According to some embodiments, a supervised approach is used to identify and classify sparse and dense seasonal patterns. In the supervised approach, domain knowledge is received as input and used to classify dense and sparse seasonal patterns. The domain knowledge may be leveraged to more reliably and accurately characterize seasonal patterns that recur within a set of time series data. For example, the determination of whether to classify an instance as a seasonal high or a seasonal low within a sparse signal or a dense signal may be performed based, at least in part, on a set of user-supplied threshold values. This user-supplied threshold values may be selected such that statistically insignificant instances are filtered out to minimize or eliminate the impact of noise while still detecting and classifying sparse and dense seasonal patterns.

Due to the scale of many systems and operations, it may not be feasible to receive domain knowledge as input for each set of time series data that is analyzed. In such cases, an unsupervised approach may be used to identify and classify sparse and dense seasonal patterns. The unsupervised approach combines a processed sparse signal with a dense signal to create a combined total signal that captures dense features and significant sparse features. The unsupervised approach generates the combined total signal without any domain knowledge or other external input, thereby reducing configuration overhead and improving scalability of the solution.

Time Series Data Sources

A time series comprises a collection of data points that captures information over time. The source of the time series data and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

Figure 2:
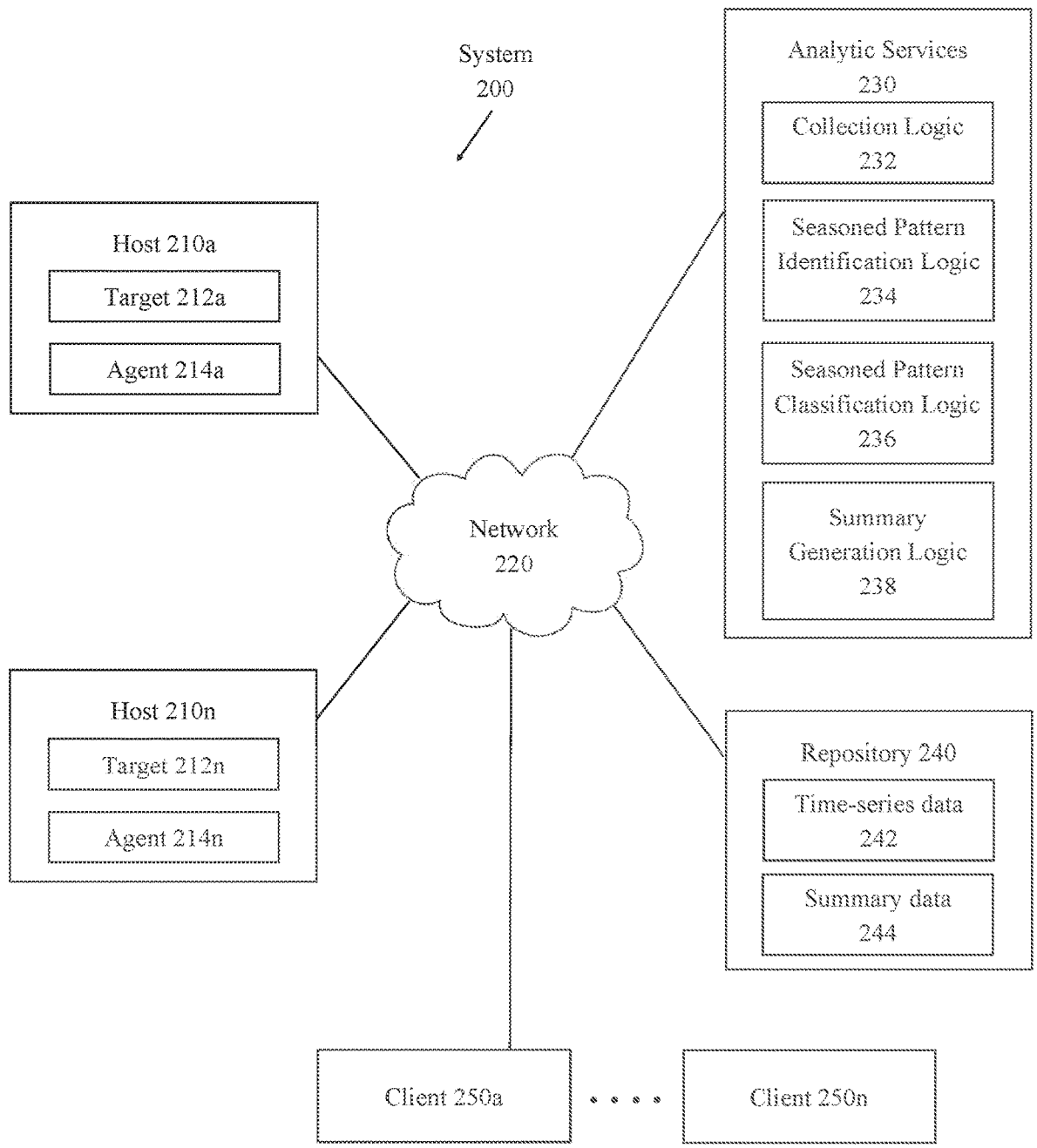
FIG. 2 illustrate an example system for and detecting and characterizing seasonal patterns within time series data.

Time series data may be collected from a single source or multiple sources. Referring to FIG. 2, for instance, it illustrates example system 200 for detecting and characterizing seasonal patterns within time series data. System 200 includes hosts 210a to 210n, network 220, analytic services 230, repository 240, and clients 250a to 250n. Components of system 200 may be implemented in one or more host machines operating within one or more clouds or other networked environments, depending on the particular implementation.

Hosts 210a to 210n represent a set of one or more network hosts and generally comprise targets 212a to 212n and agents 214a to 214n. A "target" in this context refers to a source of time series data. For example, a target may be a software deployment such as a database server instance, executing middleware, or some other application executing on a network host. As another example, a target may be a sensor that monitors a hardware resource or some sort of environment within which the network host is deployed. An agent collects data points from a corresponding target and sends the data to analytic services 230. An agent in this context may be a process, such as a service or daemon, that executes on a corresponding host machine and/or monitors one or more respective targets. Although only one agent and target is illustrated per host in FIG. 2, the number of agents and/or targets per host may vary from implementation to implementation. Multiple agents may be installed on a given host to monitor different target sources of time series data.

Agents 214a to 214n are communicatively coupled with analytic services 230 via network 220. Network 220 represents one or more interconnected data communication networks, such as the Internet. Agents 214a to 214n may send collected time series data points over network 220 to analytic services 230 according to one or more communication protocols. Example communication protocols that may be used to transport data between the agents and analytic services 230 include, without limitation, the hypertext transfer protocol (HTTP), simple network management protocol (SNMP), and other communication protocols of the internet protocol (IP) suite.

Analytic services 230 include a set of services that may be invoked to process time series data. Analytic services 230 may be executed by one or more of hosts 210a to 210n or by one or more separate hosts, such as a server appliance. Analytic services 230 generally comprise collection logic 232, seasonal pattern identification logic 234, seasonal pattern classification logic 236, and summary generation logic 238. Each logic unit implements a different functionality or set of functions for processing time series data.

Repository 240 includes volatile and/or non-volatile storage for storing time series data 242 and summary data 244. Time series data 242 comprises a set of data points collected by collection logic 232 from one or more of agents 214a to 214n. Collection logic 232 may aggregate collected data points received from different agents such that the data points are recorded or otherwise stored to indicate a sequential order based on time. Alternatively, collection logic 232 may maintain data points received from one agent as a separate time series from data received from another agent. Thus, time series data 242 may include data points collected from a single agent or from multiple agents. Further, time series data 242 may include a single time series or multiple time series. Summary data 244 stores data that characterizes seasonal patterns detected within time series data 242. Techniques for detecting seasonal patterns within time series data are described in further detail below. Repository 240 may reside on a different host machine, such as a storage server that is physically separate from analytic services 230, or may be allocated from volatile or non-volatile storage on the same host machine.

Clients 250a to 250n represent one or more clients that may access analytic services 230 to detect and characterize time series data. A "client" in this context may be a human user, such as an administrator, a client program, or some other application interface. A client may execute locally on the same host as analytic services 230 or may execute on a different machine. If executing on a different machine, the client may communicate with analytic services 230 via network 220 according to a client-server model, such as by submitting HTTP requests invoking one or more of the services and receiving HTTP responses comprising results generated by one or more of the services. A client may provide a user interface for interacting with analytic services 230. Example user interface may comprise, without limitation, a graphical user interface (GUI), an application programming interface (API), a command-line interface (CLI) or some other interface that allows users to invoke one or more of analytic services 230 to process time series data.

Seasonal Pattern Identification

Analytic services 230 includes seasonal pattern identification logic 234 for identifying seasonal patterns, if any, that may exist within an input set of time series data. When analytic services 230 receives a request from one of clients 250a to 250n to detect and/or classify seasonal patterns for a specified time series, seasonal pattern identification logic 234 processes the corresponding set of time series data to search for seasonal patterns. For instance, a client may request to view what the high and/or low seasons, if any, exist for a particular resource. In response, analytic services 230 may analyze time series data collected from the particular resource as described in further detail below and provide the user with a summary of the seasonal patterns, if any, that are detected.

Seasonal pattern identification logic 234 may analyze seasons of a single duration or of varying duration to detect seasonal patterns. As an example, the time series data may be analyzed for daily patterns, weekly patterns, monthly patterns, quarterly patterns, yearly patterns, etc. The seasons that are analyzed may be of user-specified duration, a predefined duration, or selected based on a set of criteria or rules. If a request received from a client specifies the length of the season as L periods, for instance, then seasonal pattern identification logic 234 analyzes the time series data to determine whether there are any behaviors that recur every L periods. If no patterns are detected, then seasonal pattern identification logic 234 may output a message to provide a notification that no patterns were detected. Otherwise, the detected patterns may be classified according to techniques described in further detail below.

Figure 3:
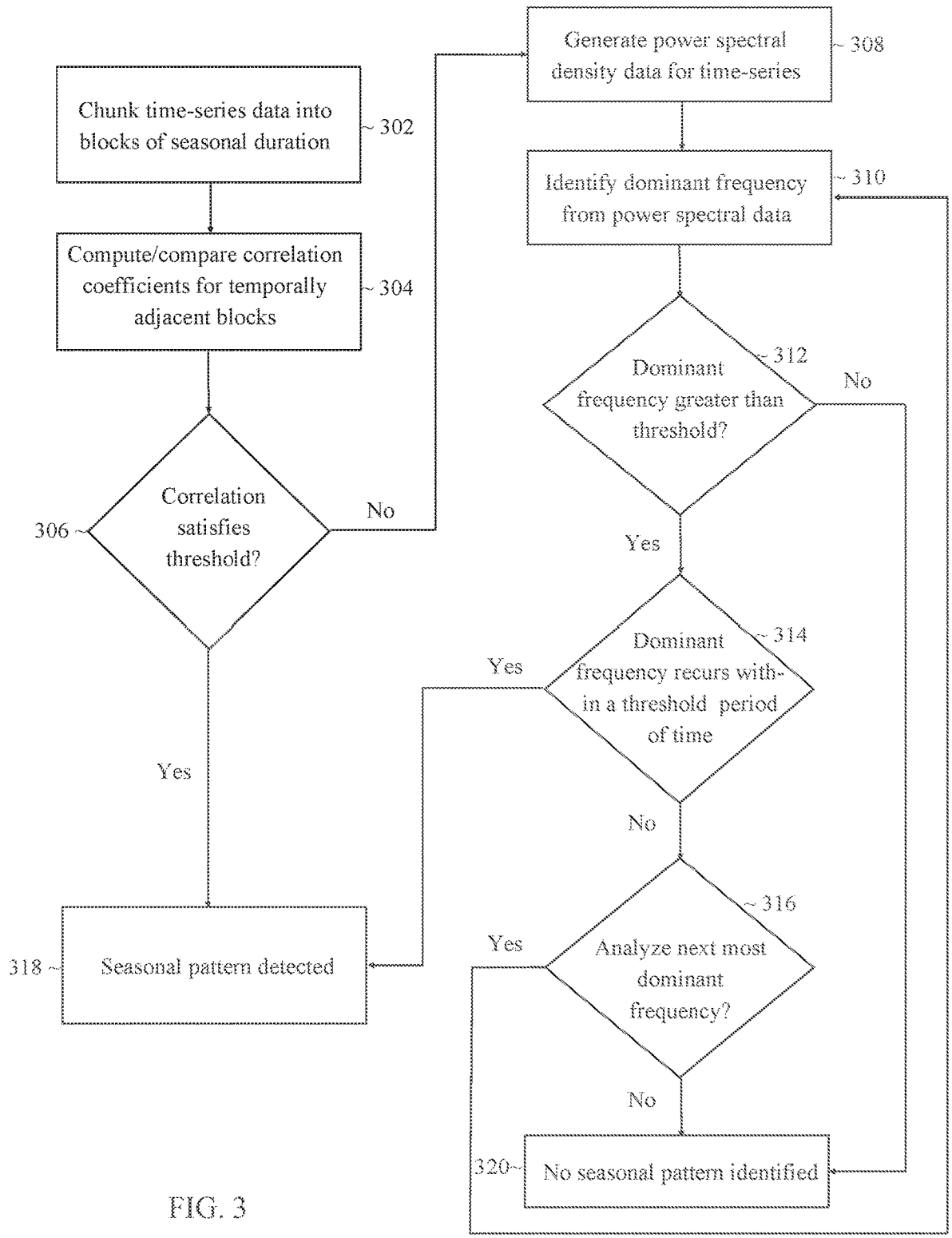
FIG. 3 illustrates an example process for determining whether a seasonal pattern is present within a set of time series data.

Referring to FIG. 3, it depicts an example process for determining whether a seasonal pattern is present within a set of time series data. Blocks 302 to 306 represent an autoregression-based analysis, and blocks 308 to 316 represent a frequency-domain analysis. While both analyses are used in combination to determine whether a seasonal pattern is present in the example process depicted in FIG. 3, in other embodiments one analysis may be performed without the other or the order in which the analyses are performed may be switched. Other embodiments may also employ, in addition or as an alternative to autoregression and frequency-domain based analyses, other stochastic approaches to detect the presence of recurrent patterns within time series data.

For the autoregression-based analysis, the process begins at block 302 where the time series data is chunked into blocks of the seasonal duration. As an example, if attempting to detect weekly patterns, then each block of data may include data points that were collected within a one week period of time. Similarly, if attempting to detect monthly patterns, then each block of data may include data points that were collected within a one month period of time.

At block 304, correlation coefficients are calculated between temporally adjacent blocks. There are many different ways in which correlation coefficients may be computed. In some embodiments, temporally adjacent blocks of the seasonal duration are overlaid, and the overlapping signals of time series data are compared to determine whether there is a strong correlation between the two functions. As an example, when attempting to detect weekly patterns, one block containing time series data for a first week may be overlaid with a second block containing time series data for a temporally adjacent week. The signals are compared to compute a correlation coefficient that indicates the strength of correlation between time points within the seasonal periods and the observed values at the time points. The coefficient between time series data from different blocks/seasonal periods may be calculated by estimating the least squares between the overlaid data (e.g., by using an ordinary least squared procedure) or using another autocorrelation function to derive values indicating the strength of correlation between the temporally adjacent blocks.

At block 306, the process determines based on the comparison of the correlation coefficients, whether the correlation between the different blocks of time satisfies a threshold value. The threshold may vary depending on the particular implementation and may be exposed as a user-configurable value. If the number of correlation coefficients does not satisfy the threshold, then the process continues to block 308, and the frequency domain analysis is performed. Otherwise, the process continues to block 318 to indicate that a seasonal pattern has been detected.

For the frequency domain analysis, the process begins at block 308, and power spectral density data is generated for the time series. The power spectral density may be generated by applying a Fast Fourier Transform to the time series data to decompose the data into a set of spectral components, where each respective spectral component represents a respective frequency of a corresponding value observed within the time series data.

At block 310, the process identifies the dominant frequency from the power spectral density data. The dominant frequency in this context represents the value within the time series data that has occurred the most frequently. Values that occur frequently may be indicative of a seasonal pattern if those values recur at seasonal periods.

At block 312, the process determines whether the dominant frequency represents a threshold percent of an amplitude of the overall signal. The threshold may vary depending on the particular implementation and may be exposed as a user-configurable value. Values that represent an insignificant portion of the overall signal are not likely to be associated with recurrent patterns within a time series. Thus, if the dominant frequency does not represent a threshold percent of the overall time series data, then the process continues to block 320. Otherwise, the process continues to block 314.

At block 314, the process determines whether the dominant frequency recurs within a threshold period of time. For instance, if searching for weekly patterns, the process may determine whether the value recurs on a weekly basis with a tolerance of plus or minus a threshold number of hours. If the dominant frequency does not recur at the threshold period of time within the time series data, then the process may determine that a seasonal pattern has not been identified, and the process proceeds to block 316. Otherwise, the process continues to block 318, and the process determines that a seasonal pattern has been detected.

At block 316, the process determines whether to analyze the next dominant frequency within the power spectral density data. In some implementations, a threshold may be set such that the top n frequencies are analyzed. If the top n frequencies have not resulted in a seasonal pattern being detected, then the process may proceed to block 320, where the process determines that no seasonal pattern is present within the time series data. In other implementations, all frequencies that constitute more than a threshold percent of the signal may be analyzed. If there are remaining frequencies to analyze, then the process returns to block 310, and the steps are repeated for the next-most dominant frequency.

Based on the analyses described above, the process determines, at block 318 and 320 respectively, whether there is a seasonal pattern or not within the time series data. If a seasonal pattern is detected, then the process may continue with classifying the seasonal pattern as discussed further below. Otherwise, the process may output a notification to indicate that no seasonal patterns recurring at the specified seasonal duration were detected within the time series data.

The process of FIG. 3 may be repeated to detect patterns in seasons of different durations. As an example, the time series data may first be chunked into blocks containing weekly data and analyzed to detect whether weekly patterns exist. The time series data may then be chunked into blocks containing monthly data and analyzed to detect whether monthly patterns exist. In addition or alternatively, the time series data may be chunked and analyzed across other seasonal periods based on the seasons that a user is interested in analyzing or based on a set of predetermined rules or criteria.

Seasonal Pattern Classification

A time series may include one or more classes of seasonal patterns. Example classes of seasonal patterns may include, without limitation, recurrent seasonal highs and recurrent seasonal lows. Each of these classes may further be broken into sub-classes including without limitation, recurrent sparse seasonal highs, recurrent sparse seasonal lows, recurrent dense seasonal highs, and recurrent dense seasonal lows. Other classes and sub-classes may also be used to characterize seasonal patterns within time series data, depending on the particular implementation. The term "class" as used herein may include both classes and sub-classes of seasonal patterns.

Figure 4:
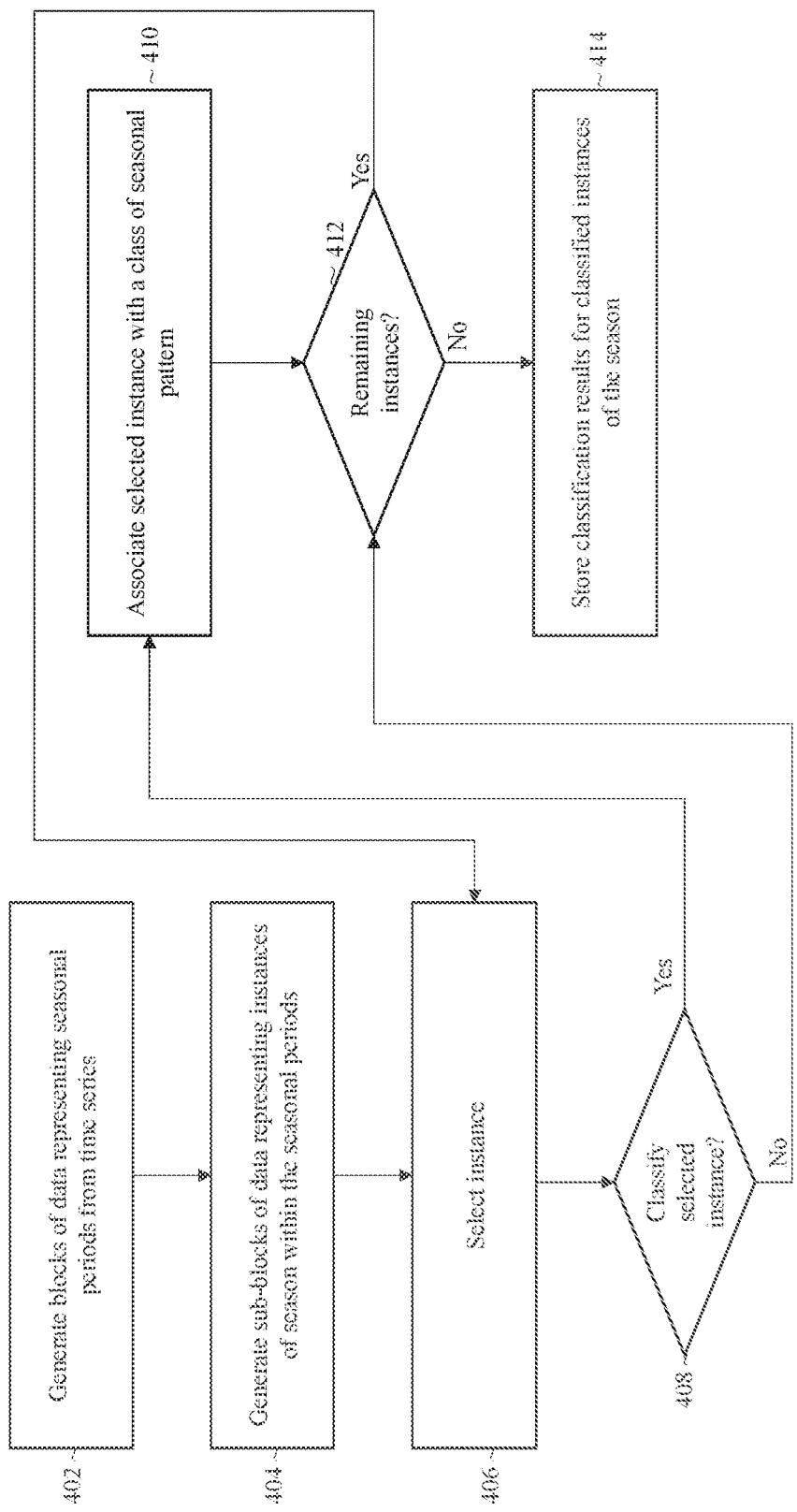
FIG. 4 illustrates an example process for classifying seasonal patterns that were identified within a set of time series data.

Analytic services 230 includes seasonal pattern classification logic 236, which preprocesses time series data 242 and classifies seasonal patterns that are detected within time series data. Referring to FIG. 4, it depicts an example process that may be implemented by seasonal pattern classification logic 236 to classify seasonal patterns.

At block 402, the time series data is preprocessed by generating blocks of data, where each block of data represents one seasonal period or sample of a season within the time series and includes data from the time series that spans a time period of the seasonal duration. As an example, if a time series includes data spanning twenty-five weeks and the length of a season is one week of time, then the time series data may be chunked into twenty-five blocks, where the first block includes data points collected during the first week, the second block data points collected during the second week, etc.

At block 404, the process generates, for each block of data, a set of sub-blocks, where each sub-block of data represents one instance of a season and includes time series data spanning a sub-period of the instance duration. The duration of the instance may vary from implementation to implementation. As an example, for a weekly season, each instance may represent a different hour of time within the week. Thus, a block representing a full week of data may be segmented into one hundred and sixty-eight sub-blocks representing one-hundred and sixty-eight different instances. If an instance is defined as representing sub-periods that are two hours in duration, then a block representing a week may be segmented into eighty-four sub-blocks. As another example, for a monthly season, an instance may correspond to one day of the month. A block representing one month may then be segmented into twenty-eight to thirty-one sub-blocks, depending on the number of days in the month. Other sub-periods may also be selected to adjust the manner in which time series data are analyzed and summarized.

At block 406, the process selects an instance of the season to analyze to determine how it should be classified. The process may select the first instance in a season and proceed incrementally or select the instances according to any other routine or criteria.

At block 408, the process determines whether and how to classify the selected instance based, in part, on the time series data for the instance from one or more seasonal samples/periods. In the context of weekly blocks for example, a particular instance may represent the first hour of the week. As previously indicated, each block of time series data represents a different seasonal period/sample of a season and may have a set of sub-blocks representing different instances of the season. Each seasonal sample may include a respective sub-block that stores time series data for the sub-period represented by the instance. The process may compare the time series data within the sub-blocks representing the first hour of every week against time series data for the remaining part of the week to determine how to classify the particular instance. If a recurrent pattern for the instance is detected, then the process continues to block 410. Otherwise the process continues to block 412.

At block 410, the process associates the selected instance of the season with a class of seasonal pattern. If a recurrent high pattern is detected based on the analysis performed in the previous block, then the instance may be associated with a corresponding class representing recurrent seasonal highs.

Similarly, the instance may be associated with a class representing recurrent seasonal lows if the process detects a recurrent low pattern from the time series data within the associated sub-blocks. In other embodiments, the respective instance may be associated with different seasonal patterns depending on the recurrent patterns detected within the sub-blocks. To associate an instance with a particular seasonal class, the process may update a bit corresponding to the instance in a bit-vector corresponding to the seasonal class as described in further detail below.

In some cases, the process may not be able to associate an instance with a class of seasonal pattern. This may occur, for instance, if the time series data within the corresponding sub-period does not follow a clear recurrent pattern across different seasonal periods. In this scenario, the process may leave the instance unclassified. When an instance is left unclassified, the process may simply proceed to analyzing the next instance of the season, if any, or may update a flag, such as a bit in a bit-vector, that identifies which instances the process did not classify in the first pass.

At block 412, the process determines whether there are any remaining instances of the season to analyze for classification. If there is a remaining instance of the season to analyze, then the process selects the next remaining instance of the season and returns to block 406 to determine how to classify the next instance. Otherwise, the process continues to block 414.

At block 414, the process stores a set of classification results based on the analysis performed in the previous blocks. The classification results may vary from implementation to implementation and generally comprise data that identifies with which seasonal class instances of a season have been associated, if any. As an example, for a given instance, the classification results may identify whether the given instance is a recurrent high, a recurrent low, or has been left unclassified.

Figure 5:
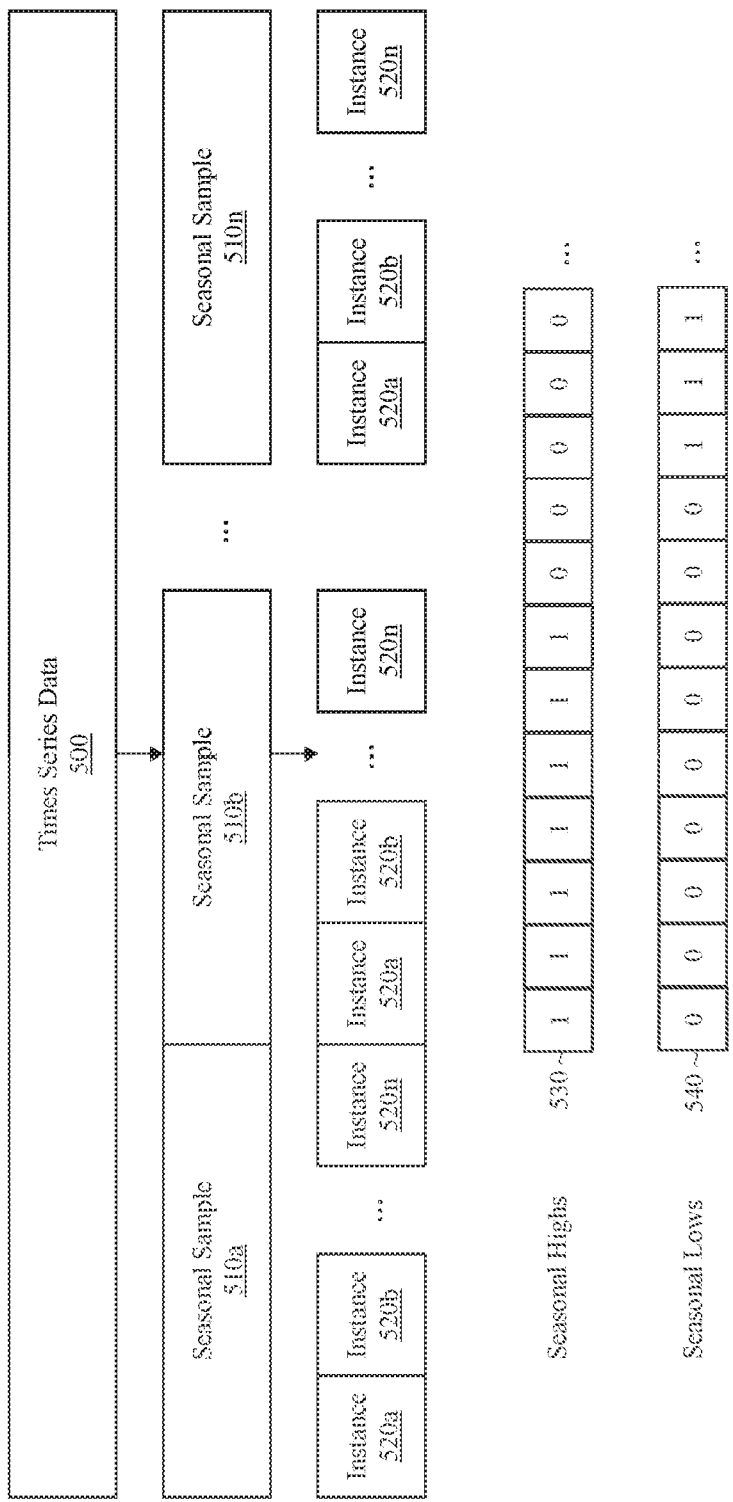
FIG. 5 illustrates an example set of classification results for classifying instances of a season.

In some embodiments, the classification of a set of instances may be stored as a set of one or more bit-vectors (also referred to herein as arrays). Referring to FIG. 5, for instance, it depicts an example classification for instances of a season detected within a set of time series data. To obtain the classification results, time series data 500 is chunked into season samples 510*a* to 510*n*. Each of seasonal samples 510*a* to 510*n* is further chunked according to the instances of a season, represented by blocks 520*a* to 520*n*, which represent n instances within the season. In the context of a weekly season, each seasonal sample may represent one week of time series data, and each instance may represent one-hour sub-periods or sub-periods of other duration within the weekly season. The seasonal samples may represent other seasonal durations and/or the instances may represent other sub-periods, depending on the particular implementation. A set of bit-vectors classify the instances of the season and include bit-vector 530, which represents a first class for seasonal highs, and bit-vector 540, which represents a second class for seasonal lows. Different bits within a bit-vector correspond to different instances of a season and act as a Boolean value indicating whether the corresponding instance is associated with a class or not. For instance, the first seven bits may be set to "1" in bit-vector 530 and "0" in bit-vector 540 to indicate that the first seven instances of the season are a high season across seasonal samples 510*a* to 510*n*. A subsequent sequence of bits may be set to "0" in both bit-vector 530 and bit-vector 540 to indicate that the corresponding instances of the season are unclassified. Similarly, a subsequent sequence of bits may be set to "0" in bit-vector 530 and "1" in bit-vector 540, to indicate that the corresponding sequence of instances of the season are a low season across seasonal samples 510*a* to 510*n*.

The length of a bit-vector may vary depending on the number of instances within a season. In the context of a week-long season, for instance, bit-vectors 530 and 540 may each store 168 bits representing one hour sub-periods within the season. However, the bit-vectors may be shorter in length when there are fewer instances in a season or longer in length when a greater number of instances are analyzed. This allows flexibility in the granularity by which seasonal instances are analyzed and classified.

Voting-Based Classification

When determining how to classify instances of a season, seasonal pattern classification logic 236 may implement a voting-based approach according to some embodiments. Voting may occur across different classification functions and/or across different seasonal periods. Based on the voting, a final, consensus-based classification may be determined for an instance of a season.

A classification function refers to a procedure or operation that classifies instances of a season. A classification function may employ a variety of techniques such as quantization, clustering, token counting, machine-learning, stochastic analysis or some combination thereof to classify instances of a season. While some implementations may employ a single classification function to classify instances of a season, other implementations may use multiple classification functions. Certain classification functions may generate more optimal classifications for volatile sets of time series data that include large fluctuations within a seasonal period or across different seasonal periods. Other classification functions may be more optimal for classifying instances in less volatile time series data. By using a combination of classification functions, where each classification function "votes" on how to classify an instance of a season, the risk of erroneous classifications may be mitigated and a more reliable final classification may be achieved.

In some embodiments, a classification may use token counting to classify instances of a season. With token counting, an instance of a season is analyzed across different seasonal periods/samples to determine whether to classify the instance as high or low. In the context of a weekly season, for example, the sub-periods (herein referred to as the "target sub-periods") represented by different instances within each week are analyzed. If the averaged value of the time series data within a target sub-period represented by an instance is above a first threshold percent, then the sub-period may be classified as a high for that week. If the value is below a second threshold percent, then the sub-period may be classified as a low for that week. Once the target sub-period has been classified across different weeks, then the instance may be classified as high if a threshold number (or percent) of target sub-periods have been classified as high or low if a threshold number (or percent) of target sub-periods have been classified as low.

In addition or as an alternative to token counting, some embodiments may use k-means clustering to classify seasonal instances. With k-means clustering, data points are grouped into clusters, where different data points represent different instances of a season and different clusters represent different classes of a season. As an example, a first cluster may represent recurrent highs and a second cluster may represent recurrent lows. A given data point, representing a particular instance of a season, may be assigned to a cluster that has the nearest mean or nearest Euclidean distance.

In some embodiments, spectral clustering may be used to classify instances of a season. With spectral clustering, a similarity matrix or graph is defined based on the instances within a seasonal period. A row or column within the similarity matrix represents a comparison that determines how similar a particular instance of a seasonal period is with the other instances of the seasonal period. For instance, if there are 168 instances within a weekly seasonal period, then a 168 by 168 similarity matrix may be generated, where a row or column indicates the distance between a particular instance with respect to other instances within the seasonal period. Once the similarity matrix is created, one or more eigenvectors of the similarity matrix may be used to assign instances to clusters. In some cases, the median of an eigenvector may be computed based on its respective components within the similarity matrix. Instances corresponding to components in the eigenvector above the median may be assigned to a cluster representing a seasonal high, and instances corresponding to components below the mean may be assigned to a second cluster representing seasonal lows.

When multiple classification functions are used, each classification function may generate a corresponding result (or set of results) that classifies instances belonging to a particular season. As an example, a first classification function may generate a first bit-vector result that identifies which instances to classify as recurrent highs and a second bit-vector that identifies which instances to classify as recurrent lows, where each respective bit in a bit-vector corresponds to a different instance of the season. Other classification functions may similarly generate a set of bit-vectors that classify instances as highs or lows. The number of classification results that are generated may vary from implementation to implementation depending on the number of classes of season and the number of functions involved in classification.

The result sets of different classification functions may be processed as "votes" to classify the set of instances in a certain way. For instance, the first bit of a bit-vector may be processed as a vote to associate the first instance of a season with a particular seasonal class, the second bit may be processed as a vote to associate the second instance of the season with a particular seasonal class, etc. The results may be combined to determine a final classification for each instance of the season. The manner in which the results are combined may be determined based on a set of voting rules, as described in further detail below.

Voting may occur across a different seasonal periods/samples as well. For example, if a time series is chunked into n blocks corresponding to n different seasonal periods, where n represents an integer value greater than one, a classification function may generate n bit-vector results for a particular class of season. Referring to FIG. 5, for instance, plurality of bit-vectors may be generated to classify seasonal high sub-periods across different seasonal samples 510a to 510n, with each bit-vector corresponds to a different seasonal sample. A bit at a particular position within each bit-vector in this case would classify a corresponding instance of a season based on the characteristics of that instance as analyzed for the respective seasonal period. Thus, the first bit in a first bit-vector may classify a first instance of a season based on an analysis of seasonal sample 510a, the first bit of a second bit-vector may characterizes the first instance of the season based on the characteristics of seasonal sample 510b, etc. Similarly the second bit of each of the different bit-vectors may classify the second instance of a season based on the respective characteristics of seasonal periods 510a and 510n, the third bit classifies the third instance, etc. A bit may thus act as a "vote" for associating an instance with a particular class based on an analysis of a corresponding seasonal period. The bit-vector results from different seasonal periods may then be combined based on a set of voting rules to generate a final consensus bit-vector result that classifies the instances of a season.

For a given set of time series data, instances of a season may be classified based on one or more voting rules, which may vary from implementation to implementation. Using a majority-vote rule, for example, an instance may be assigned to the seasonal class that has the majority of votes. In other words, an instance is associated with the seasonal class that it has been associated with by the majority of classification functions and/or across the majority of seasonal periods. If a classification function or seasonal period has associated the instance with a different seasonal class and is in the minority, it is overruled by the majority vote. In other implementations, other voting thresholds may be used. For instance, an instance may be classified as high if the corresponding sub-periods were classified as high greater than a threshold percentage and low if it was classified as low greater than a threshold percentage. As another example, the final, consensus classification may be based on a unanimous vote. If a unanimous vote is not reached, then the instance may remain unclassified. Different classification functions may also be given equal or different voting weights. Thus, classification functions that tend to be more reliable may be given stronger voting influence over the final classification of a season.

Segment Creation and Homogenization

Once the instances of a season have been initially classified, seasonal pattern classification logic 236 generates a set of segments based on the classifications. A segment in this context refers to a data object that corresponds to or otherwise identifies a stretch of time that is associated with a particular seasonal class. Instances that represent temporally adjacent sub-periods and that share the same classification are merged into or otherwise associated with the same segment. An instance that is assigned to a segment is referred to herein as "belonging" to the segment. The stretch of time represented by the segment covers one or more sub-periods represented by one or more instances that belong to the particular segment.

In some embodiments, a segment may be defined by a start time and an end time. In the context of weekly seasons, for instance, a segment may be defined by a day and the start/end hours in the day that are associated with a particular class. Thus, a first segment may identify Monday, 9 a.m. to 5 p.m. (which may be written as M 9-17) as a high season, a second segment may identify Tuesday 1 a.m. to 8 a.m. (which may be written as T 1-8) as a low season, etc. In the context of a monthly season, the segment may be defined in the same manner or may be defined as a week and the start/end days in the week. Thus, the granularity through which the segment identifies a stretch of time may vary depending on the particular implementation.

In some embodiments, a segment that is associated with a particular seasonal class may be "filled in" with one or more unclassified instances. Filling in the segment with an unclassified instance may include assigning or otherwise associating an unclassified instance with the segment. When an unclassified instance is filled in to a particular segment, the unclassified instance belongs to the segment and is thereby associated with the same seasonal class as the classified instances that belong to segment. In other words, the stretch of time represented by the segment is expanded to cover the sub-period(s) represented by the unclassified instance(s) in addition to the sub-period(s) represented by the classified instance(s) that belong to the segment. Expanding a segment to cover unclassified instances allows for the creation of intuitive, easily processed seasonal classifications that provide similar descriptions of inter-period patterns. As an example, a segment may be expanded and homogenized with other segments by looking for common start/end hours of a high season that spans every day of the work week or a start/end hour of high season that occurs every second Friday of a month. Homogenizing across different segments based on commonalities may also lead to outputs that are more consistent and represent a higher level synthesis of recurrent patterns than a simple high/low classification.

Figure 6:
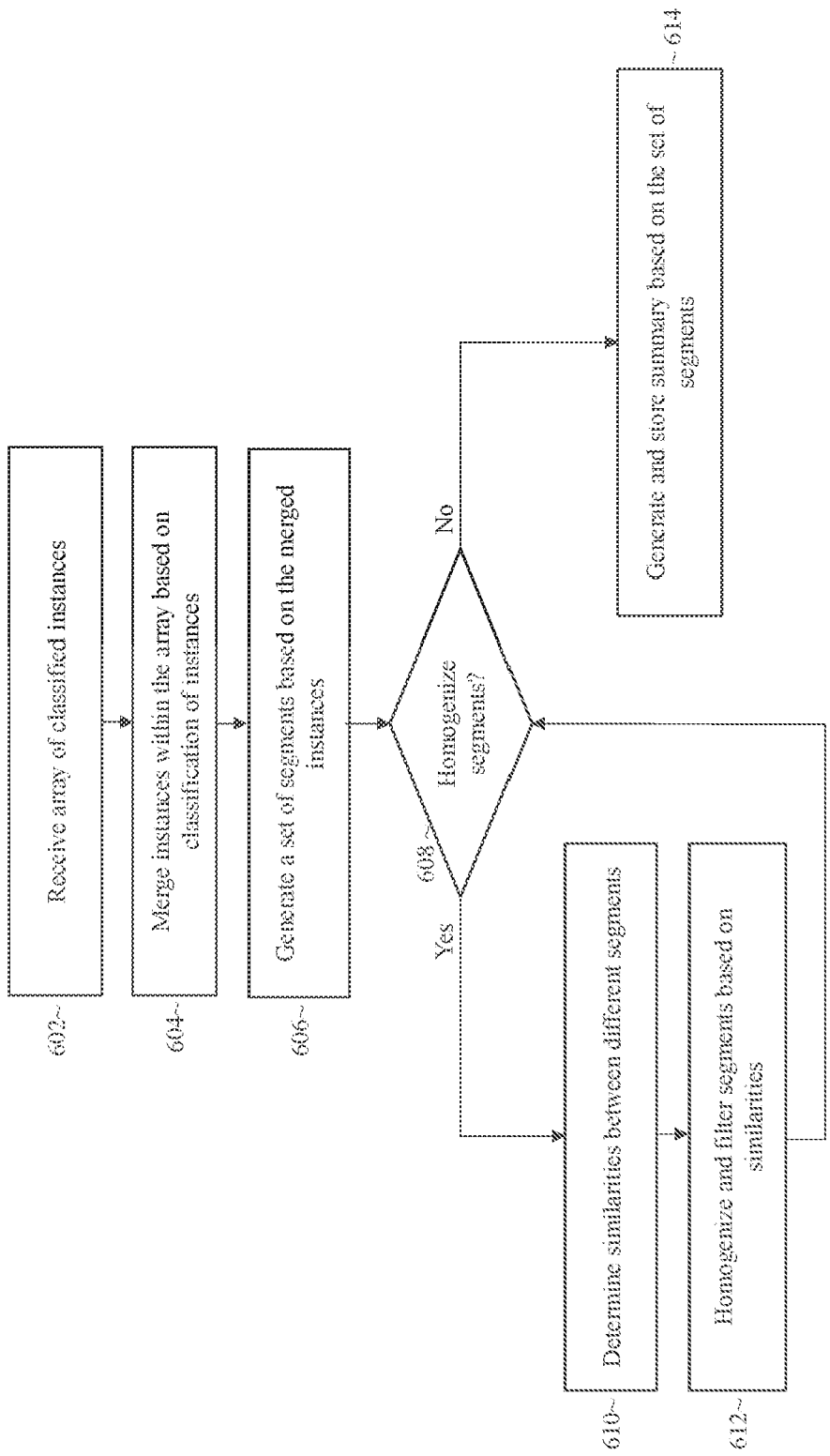
FIG. 6 illustrates an example process for generating and homogenizing a set of segments based on a set of classified instances within a season and using the homogenized segments to generate summary data for one or more classes of seasonal patterns.

FIG. 6 depicts an example process for generating and homogenizing a set of segments based on a set of classified instances, where the set of homogenized segments are used to generate summary data for one or more classes of seasonal patterns. At block 602, the process receives, as input, a set of classified instances. As an example, the input may comprise a set of Boolean arrays/bit-vectors, as previously described, where an array corresponds to a particular seasonal class and identifies which instances of a season are associated with the class. In the context of weekly seasons, the instances may be modelled as Boolean arrays with 168 elements, with each element indicating if the hour is consistently high or low across different seasonal periods.

At block 604, instances within an array are merged based on the classification. As an example, instances within the array may be merged when they are located between two other instances of the array that share the same classification, the two other instances are within a prescribed or threshold number of instances of one another within the array (as determined by bit position in the array), and the instances to be merged are not associated with a conflicting classification. In the context of weekly seasonality and detection, for instance, if two hours are classified the same (high or low), then unclassified hours between those two hours may also be reclassified as high or low if there are no conflicting classifications (low or high) between the two hours.

At block 606, a set of segments is generated for the merged instances. For a given set of instances that have been merged, a corresponding segment may be generated that represents that stretch of time covered by the merged instances. In the context of weekly seasonality detection, the segment may be defined by a day and start/end hours determined from the set of merged instances that belong to the segment. Thus, if the merged instances represent one-hour sub-periods that span from Monday, 9 a.m. to 5 p.m., then a corresponding segment is created that identifies this stretch of time. Once generated, the segments may be stored in volatile and/or non-volatile storage.

At block 608, the process determines whether to homogenize the set of segments. The determination may be based on one or more criteria, which may vary from implementation to implementation. In some embodiments, homogenization may occur recursively until the created segments reach a threshold level of homogeneity. In other embodiments, homogenization may be occur recursively a specified number of times. In other embodiments, homogenization may be skipped entirely.

At block 610, the process calculates similarities between different segments that have been created for a given season. The similarity between two segments may be determined based on commonalities between the different segments such as common start/end hours across segments associated with different days or different seasonal periods. For instance, the similarity may be determined from the ratio of the number of overlapping instances to the maximum of the segments' length. More specifically if $i_1$ and $i_2$ are two sets of instances described by two segments, the similarity between them is $s=|i_1 \cap i_2|/\max(|i_1|, |i_2|)$. Here, $|i_i|$ calculates the cardinality or length of the set $i_1$ and $\cap$ is the intersection. For example, the similarity of the segments Monday 5-8 and Tuesday 4-7 is $|\{5,6,7,8\} \cap \{4,5,6,7\}|/\max(\{5,6,7,8\}, \{4,5,6,7\})=\frac{3}{4}$. The similarity calculation at this block may be performed as part of block 608 to determine whether the segments have met a threshold level of similarity/homogenization or may be performed as a separate and independent step.

At block 612, the process homogenizes and filters segments based on the segment similarities. Segments that are similar and share commonalities may be homogenized by adjusting the stretches of time covered by the segment. Homogenization may include setting the segment start/end times to their respective min/max of the two segments and/or correcting for any overlap with segments of opposing types. For example, if there are "high" segments corresponding to stretches of time Monday 5-8 and Tuesday 4-9 and a "low" segment corresponding to the stretch of time Monday 9-12, then the high segments may be updated to represent the stretches of time Monday 4-8 and Tuesday 4-8. Thus, the high segment for Monday 5-8 is expanded to cover the instance representing Monday from 4-5. The high segment representing Tuesday 4-9 is contracted to 4-8 due to the overlap with the low segment. After similar segments within the set have been homogenized, one or more segments may either be identical with or fully contained in another segment. These segments may be filtered by removing them from the set that is used to summarize the season.

After block 612, the process returns to block 608, and the process determines whether to repeat homogenization on the updated segments. In the context of weekly seasonality detection, one technique is to perform the homogenization twice for high and low patterns. However, homogenization may recursively occur any number of times as previously described. Once homogenization and filtering is complete, the process continues to block 614.

At block 614, the process generates and stores, in volatile or non-volatile storage, a summary based on the (homogenized or unhomogenized) set of segments. A summary in this context refers to one or more data objects that identify one or more stretches of time representing at least one class of seasonal pattern. In the context of a weekly season, for example, the process may generate summary data that identifies the days and hours, as determined from the segments after homogenization (if applied), that are associated with a particular seasonal class. The process may merge inter-period segments to create a more intuitive and easy to process summary. For example, if the segments Monday 9-17, Tuesday 9-17, Wednesday 9-17, Thursday 9-17, and Friday 9-17 are associated with the same seasonal class, then the seasonal pattern may be summarized as Monday-Friday 9-17.

FIG. 7 depicts example summary data that is obtained through generating and homogenizing a set of segments based on a set of classified instances. Chart 702 depicts the instances within a week that have been classified as seasonal highs. Chart 704 depicts the resulting segments that are generated from the instances within the week and a two-pass homogenization of the segments used to summarize the seasonal high pattern. As shown, the initial set of segment that are generated includes Monday 21-23, Tuesday 0-5, Tuesday 20-23, etc. In the first homogenization pass through, some of the segments are expanded to cover unclassified instances. For instance, Monday 21-23 is homogenized to Monday 20-23 to include the previously unclassified instance Monday 20-21. Similarly, Friday 0-6 is expanded to include two additional adjacent and unclassified instances, resulting in the segment being expanded to Friday 0-8. The second homogenization pass further modifies the segments, after which, the summary of the seasonal patterns is generated. The summary merges inter-period segments that have overlapping sub-period classifications. Thus, the summary data identifies Monday-Friday 20-23 and Tuesday-Saturday 0-8 as high seasons within the week.

Summary Views and Interfaces

Figure 8:
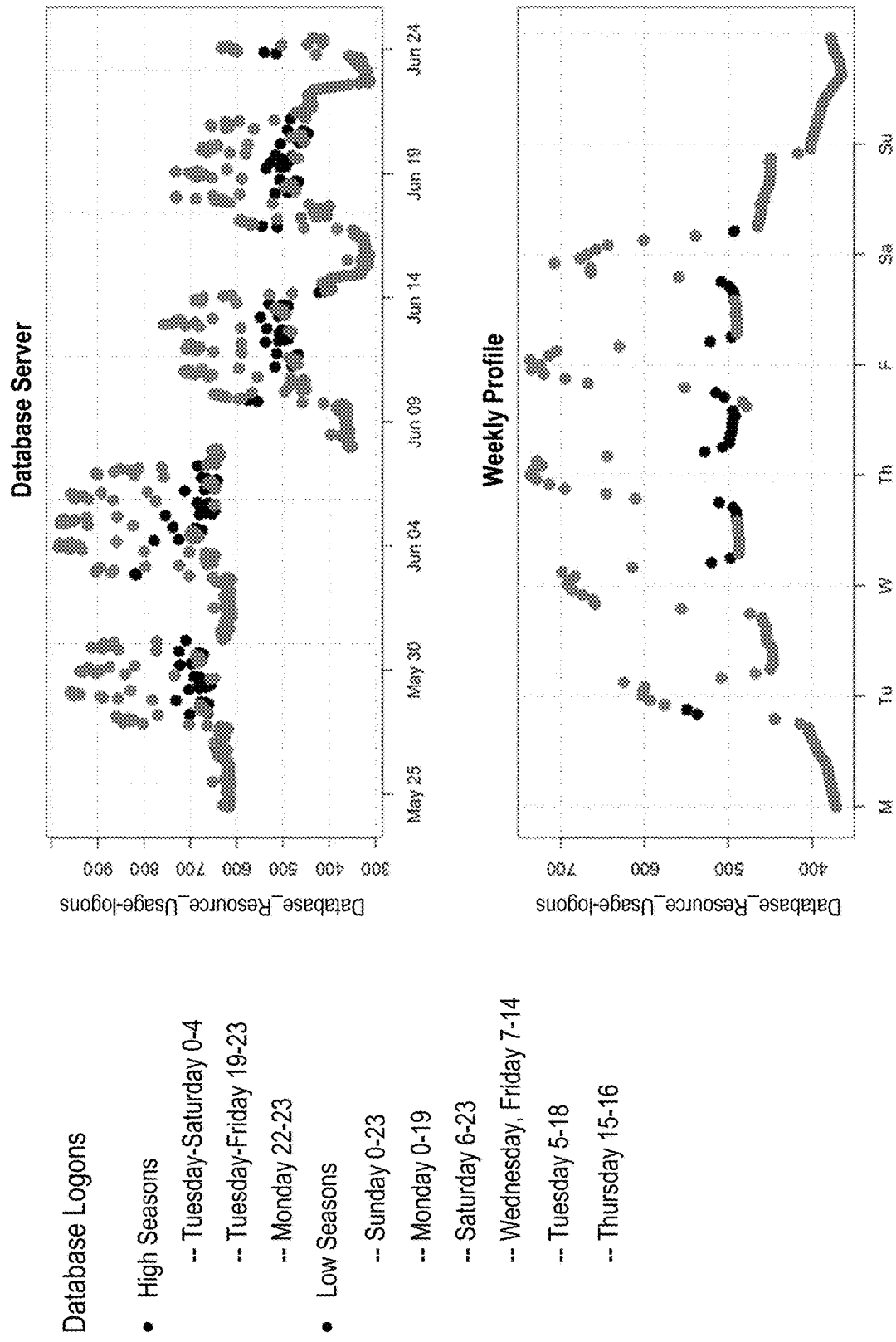
FIG. 8 illustrates an example summary for seasonal patterns that have been classified as recurrent weekly highs and recurrent weekly lows.

The summary data that is generated for a given set of time series data may provide one or more views or other interfaces for analyzing classified seasonal patterns. For example, summary generation logic 238 may generate GUI objects, interface controls, textual data and/or other data objects to display a summary of what recurrent patterns were detected and how they were classified. Referring to FIG. 8, it depicts an example summary for seasonal patterns that have been classified as recurrent weekly highs and recurrent weekly lows. The summary includes data that identifies the seasonal class and the stretches of time/segments that belong to the seasonal class. In the present example, the seasonal classes correspond to recurring seasonal highs and recurring seasonal lows for weekly database logons. The summary data includes a weekly profile view that allows a user to visualize a prototypical weekly season. The data points in the weekly profile view may be generated based on extracted sparse/dense seasonal components, nominal values detected within the time series data, and/or inferred trend points.

Summary generation logic 238 may generate an interface that allow the user to navigate to different summary views and/or to drill-down to view more details about a seasonal profile. In the context of database logons, for example, the user may navigate to a specific week to view historical and/or predicted database logons. When the classifications are generated based on data collected from multiple hosts, the user may drill down to a specific host to view the seasonal patterns for the specific host database. Thus, the user may view the classified seasonal patterns and trends for an individual target hardware or software resource and for a group of target hardware and/or software resources. With database logons, for instance, the user may view seasonal logon patterns for an individual database server instance and seasonal logon patterns for a group of database server instances. This allows the user to analyze seasonal patterns for overall database usage across multiple database servers as well as seasonal patterns for a specific database server.

In addition or alternatively, summary generation logic 238 may generate an interface that allows the user to navigate between seasonal patterns for different classes of data. As an example, within a datacenter or other networked environment, various attributes of hardware and/or software resources within the environment may be monitored. The time series data that is monitored may track resource usage and/or consumption at various points in time. Example time series data that may be monitored within the environment may include, without limitation, database logons, database active sessions, database transaction response times, the number of HTTP requests, host disk input/output operations, virtual machine heap usage, host machine memory usage, etc. The seasonal pattern detection and classification techniques described above may be applied to the different classes of time series data in order to classify seasonal patterns for different monitored hardware and/or software resources. The user may then navigate between the classified seasonal patterns for the different resources. For instance, the user may first view a summary classifying high seasons and low seasons for database logons, then a summary classifying high seasons and low seasons for database active sessions, etc. Thus, a system administrator or other user may be provided with an intuitive display allowing the user to quickly analyze seasonal usage patterns for various resources within a monitored environment.

The summary data that is generated may be integrated into or otherwise provided upon request to one or more applications. Example applications that may generate and/or access the summary data to perform various seasonal-aware operations may include, without limitation:

A seasonal-aware anomaly detection and training system that uses the summary data to train and evaluate anomaly detectors, accounting for seasonal highs, seasonal lows, and/or other seasonal patterns. For instance, a sudden spike in database logons may appear to be an anomalous high, but may, in actuality, be a seasonal sparse high. The anomaly detectors may be trained based on such seasonal patterns to reduce false flags when identifying and classifying anomalies.

A maintenance planning system that uses the summary data to schedule and perform maintenance at optimal times. For example, maintenance may be set for a window of time that has maximal overlap with seasonal lows for target software or hardware deployments that are being monitored.

A job scheduling system that uses the summary data when scheduling collection of statistics, memory compaction, or other similar batch jobs. The process may schedule the batch jobs to overlap with seasonal lows.

A consolidation system that uses the summary data to recommend resource consolidation or to automatically consolidate resources. For instance, a set of target hardware and/or software resources with non-overlapping seasons may be consolidated into a single hardware or software resource.

A capacity planning system that uses the summary data to isolate and trend high seasons to determine whether the deployed software and/or hardware resources are sufficient to satisfy usage demands.

Applications, such as those listed above, may interact with analytic services 230 to request and/or receive the summary data. The applications may specify one or more parameters, such as the length of the season, the set of time-series data to analyze, threshold values, etc. to generate the summary when submitting a request to analytic services 230. Based on the parameters, analytic services 230 may analyze and generate summary data for one or more time-series based on the techniques previously described.

Sparse and Dense Features within Time Series Data

As previously indicated, a given set of time series data may include sparse seasonal patterns and/or dense seasonal patterns. A feature/pattern is considered sparse if its duration within a season is less than a threshold thereby indicating that the exhibited behavior is an outlier. Sparse features generally manifest as an isolated data point or as a small set of data points that are far removed from the average data point within the time-series. Conversely, a feature/pattern is considered dense if its duration within a season satisfies the threshold (e.g., falls within the threshold or is higher than the threshold), indicating that the exhibited behavior is not an outlier. In some embodiments, a dense signal represents a plurality of instances of time-series data that (1) significantly represents an entire period or sub-period of data and (2)

exclude a relatively small portion (e.g., 1%, 5%, or some other threshold) of the data as outliers that are not the subject of the fitted signal. A sparse signal may represent data points that are excluded from the dense class of data points as outliers. For example, a dense signal may approximate a seasonal period or sub-period of a time series by, for each time increment in the time series, approximating the data point that is, over multiple historical instances of the time increment in multiple historical instances of the time series, average, most likely, most central, has the least average distance, or is otherwise a fit or best fit for the multiple historical instances of the time increment. In one embodiment, if there is no single data point that can approximate, with a certain level of confidence or significance, a particular time increment, that time increment can be classified as not having a dense signal.

There are many possible causes of a sparse signal within a set of time series data. As an example, sparse signal may correspond to a sudden surge (a sparse high) or drop-off (a sparse low) in the usage of a particular target resource. In some instances, the sparse signal may be noise, such as activity cause by an anomalous event. In other instances, a surge or drop-off may be caused by a recurrent seasonal event, such as a periodic maintenance operation.

For a given set of time series data, a noise signal may have a magnitude that dominates that of a smaller dense pattern. Without a separate treatment of sparse and dense features in the time series data, a dense pattern may potentially be overlooked due to the magnitude of the overlaid noise. In order to prevent the dense pattern from going unclassified, seasonal pattern classification logic 236 may filter or separate out the noise data from the dense data within a time series. Seasonal pattern classification logic 236 may further provide separate processing for sparse and dense features of the time series when selecting the recurrent highs and recurrent lows for a season.

In the sections below, both a supervised and an unsupervised method are described for classifying recurrent highs and recurrent lows within a time series. Both the supervised and unsupervised method split or "decompose" the time series into a noise signal and a dense signal. The noise signal, also referred to herein as a sparse signal or sparse component, captures the sparse distribution of data in a time series that otherwise has a dense distribution. By contrast, the dense signal, also referred to herein as the dense component, captures the dense distribution using smoothing or averaging such that the noise signal is filtered out and removed.

The manner in which a set of time series data is decomposed into a sparse component and dense component may vary depending on the particular implementation. In some embodiments, the dense component may be obtained from the seasonal factors of an Additive Holt-Winters model. As previously indicated, the Holt-Winters model employs triple exponential smoothing to obtain the seasonal index. The applied smoothing, in effect, removes the sparse component of the original time series signal. The result is a time series that includes the dense features of the original time series. While the Additive Holt-Winters model may be used to generate a dense signal for a time series, in other embodiments, other techniques, such as other localized averaging or smoothing functions, may be used to obtain the dense signal. Once the dense component has been generated and stored, the noise component may be determined by taking the original set of time series data and subtracting out the dense component from the original signal. The resulting noise signal is a time series that includes the noise features from the original time series.

By decomposing the time series into a dense and noise component, the dense and sparse features may be processed independently. For a given instance of a season, the classification of that instance may be based on a processing of the dense component, the sparse component, or some combination thereof. In the context of a weekly season, for example, the instance representing Monday from 9-10 may be selected as a recurrent high or recurrent low based on the sparse and/or dense features analyzed for that instance.

Processing a component signal may include, without limitation, applying smoothing functions, filters, classification functions, etc. Processing may be performed in a manner that accounts for differences in the characteristics of the dense and noise signals. As an example, the noise signal may be filtered and smoothed differently than the dense signal as the variation between the two signals may be significantly different. As another example, the classification functions that are applied may differ between the sparse component and the dense component. Example processing is provided further below in the descriptions of the supervised and unsupervised selection of recurrent high and low patterns.

Supervised Method for Selecting Recurrent High and Low Patterns in Time Series Data In a supervised method for selecting recurrent high and low patterns in a time series, seasonal pattern classification logic 236 receives domain knowledge as input to aid in the classification of seasonal patterns. The domain knowledge in this context comprises data that is associated with a specific domain, such as a specific target resource, set of target resources, time series, or set of time series. For instance, the domain knowledge for a particular software resource may include data specifying parameters for classifying a particular instance of a season as high or low. The domain knowledge/parameters input when analyzing a time series for one software resource or set of software resources may differ from the domain knowledge/parameters that are input when analyzing a time series for another. The parameters may be selected based on the different expected or observed usage patterns for the different resources.

Figure 9:
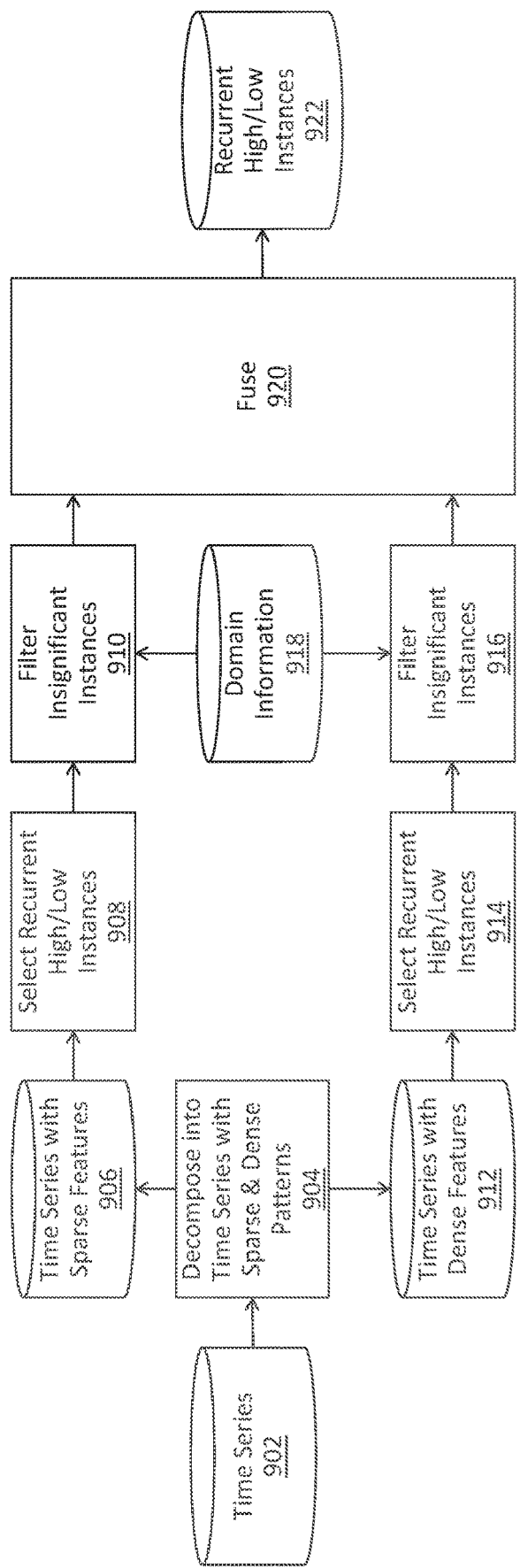
FIG. 9 illustrates an example supervised process for selecting recurrent high and low values in a time series.

FIG. 9 depicts an example supervised process for selecting recurrent high and low values in a time series data. At block 902, a time series is received by seasonal classification logic 236. The time series data may originate from one or more data sources as previously described. As an example, the time series may comprise a collection of data points that track usage or performance information over time for a particular resource or set of resources.

At block 904, seasonal pattern classification logic 236 decomposes the time series into a dense component and a noise component. The dense component and noise component may be obtained as previously described. In the context of a weekly seasonality detection and characterization, for example, a sparse time series may be obtained by calculating the difference of the time series received at block 902 and a smoothed version of the time series. A dense time series may be obtained from the seasonal factors from an Additive Holt-Winters decomposition of the smoothed time series.

In response to decomposing the original time series, the sparse time series and the dense time series are stored, in volatile and/or non-volatile storage, at block 906 and block 912, respectively. A set of one or more processes may then analyze and process both components independently. Block 908 and block 910 depict example processing that may be applied to the sparse component of the time series, and block 914 and block 916 depict example processing that may be applied to the dense component.

At block 908, seasonal pattern classification logic 236 generates a first classification of the instances of the season by selecting recurrent high and low instances from the time series with sparse features. Seasonal pattern classification logic 236 may apply one or more classification functions as previously described to classify the instances of the season. In the context of a weekly season with instances that span one-hour sub-periods, an ensemble of classification functions, such as spectral clustering, K-means analysis, etc., may be used with a majority-voting consensus to classify 168 instances of the season. However, the classification functions and number of instances that are classified at this block may vary depending on the particular implementation. Seasonal pattern classification logic 236 may generate a set of one or more bit-vectors that indicate which instances were selected as high and which were selected as low for the time series with sparse features.

At block 914, seasonal pattern classification logic 236 selects the recurrent high and low instances from the time series with dense features. Seasonal pattern classification logic 236 may apply the same classification functions applied to the time series with sparse features or apply different classification functions, depending on the particular implementation. For instance, seasonal pattern classification logic may use spectral clustering, K-means analysis, token counting, etc. Seasonal pattern classification logic 236 may generate a set of one or more bit-vectors that indicate which instances were selected as high and which were selected as low for the time series with dense features.

At block 918, seasonal pattern classification logic 236 receives domain knowledge for filtering selected instances. The domain knowledge may be input by a human user, such as an administrator, one or clients 250a to 250n, an application, or through some other interface. In some embodiments, the domain knowledge comprises a user-supplied minimum variation for filtering out and ignoring selected instances. For instance, the domain knowledge may specify that instances that have a normalized magnitude below a threshold value, such as a variation of less than a threshold percent from the nominal magnitude, are filtered out and ignored. A "normalized magnitude" in this context refers to a ratio of the magnitude of the sparse signal for the instance to a nominal magnitude. In another example, the domain knowledge may specify that instances with a magnitude that fall below a user-specified threshold magnitude are filtered out and ignored. In the context of database sessions, for instance, the user may specify that instances where there are below ten active sessions are ignored.

At block 910, seasonal pattern classification logic 236 filters, based on the received domain knowledge, insignificant instances from the time series with sparse features. As previously indicated, seasonal pattern classification logic 236 may filter selected high instances whose magnitude is below a user specified value or whose normalized magnitude (ratio of magnitude to nominal magnitude) is below a user specified value. Filtered instances are not given weight when obtaining the final selection of recurrent high and lows for the instances as described further below.

At block 916, seasonal pattern classification logic 236 filters, based on the received domain knowledge, insignificant instances from the time series with dense features. The same threshold variation used to filter instances the sparse signal may also be used to filter instances from the dense signal or a different threshold may be used, depending on the domain knowledge that is input.

At block 920, the selected instances from the sparse data are fused with the selected instances from the dense data. In order to fuse the data, seasonal pattern classification logic 236 may retain selected highs if they are selected from either the sparse or dense time series and retain lows if they are selected from the dense time series and are not selected as high from the sparse. Selected instances that are filtered out are ignored at this step. Thus, an instance initially selected as a high from the sparse time series that is filtered out is not retained at this step.

At block 922, the final set of selected instances are obtained from the fused data. Seasonal pattern classification logic 236 may store, in volatile or non-volatile storage, a set of one or more bit-vectors to identify the selected instance. In the context of a weekly seasons, for instance, a first bit-vector may comprise 168 bits identifying whether each one-hour instance in a week has been classified as a high, a second bit-vector may identify whether each one-hour instance is classified as a low, and a third bit-vector may identify which of the instances are sparse highs. Once the final set of selected instances have been obtained, a set of segments may be generated and homogenized as described above based on the set of bit-vectors.

Unsupervised Method for Selecting Recurrent High and Low Patterns in Time Series Data In some embodiments, seasonal classification logic 236 may support an unsupervised method for selecting recurrent high and low patterns in a time series. The unsupervised approach allows for automatic selection of recurrent high and low seasonal patterns without receiving a detailed specification of what the high and low patterns should be. Put another way, the unsupervised approach provides a mode of operation that allows for minimal input from a user since the significance of seasonal patterns are implicitly inferred.

The unsupervised approach may be used for applications where the scale of the analysis prevents the reliable capture and injection of domain information that is used by the supervised approach. Seasonal classification logic 236 may determine if such domain information is available when analyzing a given set of time series data. If not, seasonal classification logic 236 may use the unsupervised approach rather than the supervised approach. For instance, if a user would like to make seasonal aware planning decisions for hundreds of individual software targets, the user may not be able to provide domain information specifying what the high and low patterns look like for each application. Thus, an unsupervised process may be used to classify seasonal patterns.

Figure 10:
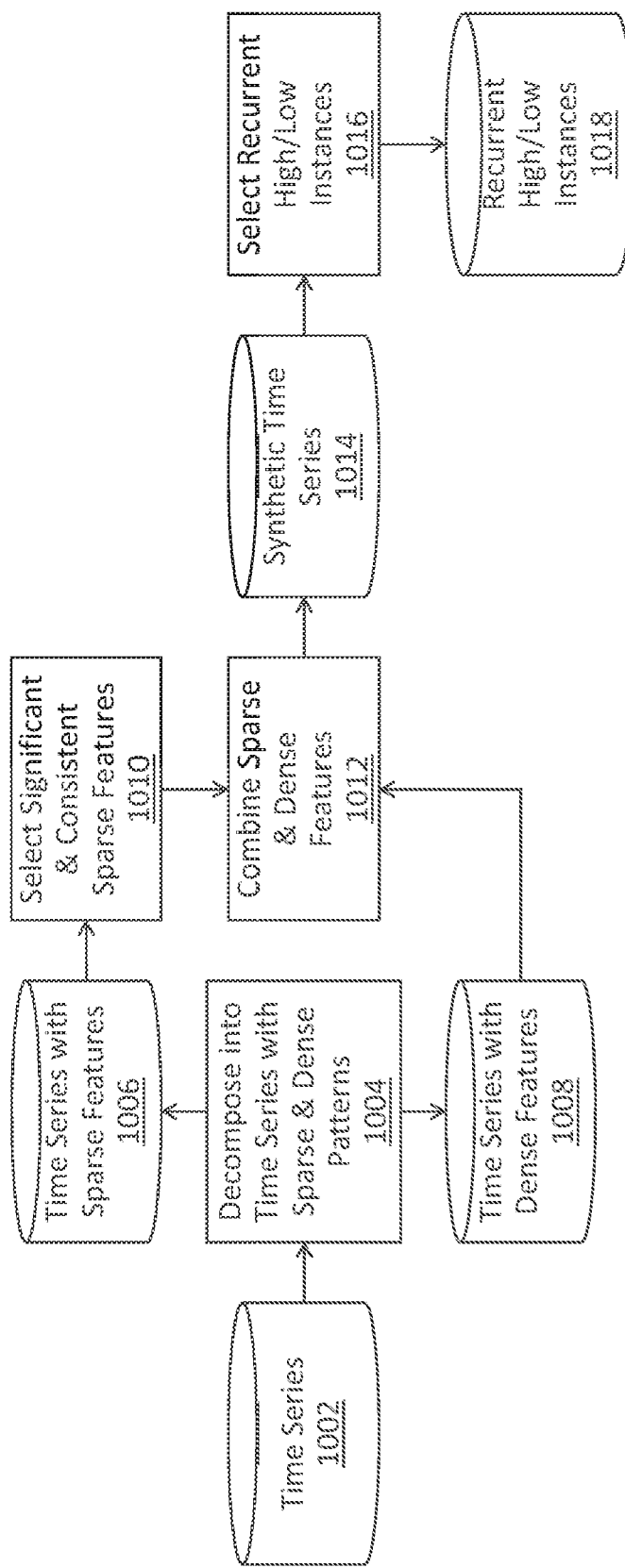
FIG. 10 illustrates an example unsupervised process for selecting recurrent high and low values in a time series.

FIG. 10 depicts an example unsupervised process for selecting recurrent high and low values in a time series data. At block 1002, a time series is received by seasonal classification logic 236. The time series data may originate from one or more data sources as previously described. As an example, the time series may comprise a collection of data points that track usage or performance information over time for a particular resource or set of resources.

At block 1004, seasonal pattern classification logic 236 decomposes the time series into a dense component and a noise component. The dense component and noise component may be obtained as previously described for the supervised approach and other sections above. In the context of a weekly seasonality detection and characterization, for example, a sparse time series may be obtained by calculating the difference of the time series received at block 902 and a smoothed version of the time series. A dense time series may be obtained from the seasonal factors from an Additive Holt-Winters decomposition of the smoothed time series.

In response to decomposing the original time series, the sparse time series and the dense time series are stored, in volatile and/or non-volatile storage, at block 1006 and block 1008, respectively. A set of one or more processes may then analyze and process both components independently. Block 1010 depicts example processing that may be applied to the sparse component of the time series.

At block 1010, seasonal pattern classification logic 236 selects significant and consistent sparse features from the time series with sparse data. To select statistically significant sparse features a maximum concentration interval may be used to retain features that lie outside a prescribed coverage (ex. 99%). The threshold of the maximum concentration interval may vary depending on the particular interval. Sparse features that have a magnitude that does not fall outside of the threshold are determined not to represent candidate sparse highs and are filtered out.

To select consistent features seasonal pattern classification logic 236 may perform conditional averaging of the statistically significant instances (referred to herein as "candidate sparse features") over a prescribed period, where conditioning is performed to mitigate or eliminate the impact of features that do not recur. For instance, a candidate sparse feature that does not recur in a threshold number of seasonal samples may be filtered out from the sparse data. In the context of weekly seasonality detection and characterization, the selection of consistent features may be accomplished by calculating the hourly average of the candidate sparse features with the minimum and maximum sparse features removed from the candidate set. The output of this step are features for a prototypical week. To get the combined time series used in subsequent steps, the sparse features for a prototypical week have the same statistically significant and consistent sparse features as the original time series. The output of this step may be used to annotate which instances or sub-periods of a season have been identified as sparse features.

At block 1012, a modified, reconstructed time series is generated by combining the processed sparse time series with the (processed or unprocessed) time series with dense features. In some embodiments, one or more dense feature from the original time series may be removed before recomposing the modified time series such that the modified time series does not include these dense features. For instance, a smoothing function may be applied or insignificant dense features may otherwise be filtered out before combining the dense signal with the processed sparse signal. In other embodiments, the processed sparse signal may be combined with an unprocessed dense signal, thereby retaining each of the dense features in the original time series. In either case the updated time series captures the significant/consistent sparse features of the original time series as well as at least a subset of dense features from the original time series. The updated time series does not capture sparse features that are insignificant and/or inconsistent as well as dense features, if any, that have been filtered.

At block 1014, the modified, reconstructed time series is stored in volatile or non-volatile storage. By filtering out sparse features that are not statistically significant or consistent sparse features are considered, the impact of the noise signal on the dense distribution may be significantly reduced. At the same time, by retaining the features that are statistically significant and consistent, the sparse features that may represent seasonal patterns may be detected from the reconstructed time series and classified.

At block 1016, seasonal pattern classification logic 236 selects recurrent high and low instances from the reconstructed time series data. Seasonal pattern classification logic 236 may apply one or more classification functions as previously described to classify the instances of the season. In the context of a weekly season with instances that span one-hour sub-periods, an ensemble of classification functions, such as spectral clustering, K-means analysis, etc., may be used with a majority-voting consensus to classify 168 instances of the season. However, the classification functions and number of instances that are classified at this block may vary depending on the particular implementation. Seasonal pattern classification logic 236 may generate a set of one or more bit-vectors that indicate which instances were selected as high and which were selected as low for the time series with sparse features.

At block 1018, the final set of selected instances determined at block 1016 are stored in volatile or non-volatile storage. As previously described, the classification results may comprise a set of one or more bit-vectors to identify the selected instance. In the context of a weekly seasons, for instance, a first bit-vector may comprise 168 bits identifying whether each one-hour instance in a week has been classified as a high, a second bit-vector may identify whether each one-hour instance is classified as a low, and a third bit-vector may identify which of the instances are sparse highs. Once the final set of selected instances have been obtained, a set of segments may be generated and homogenized as described above based on the set of bit-vectors.

Annotating Summary Views Based on Sparse and Dense Data

In some embodiments, the sparse recurrent high and/or low instances are used to annotate and extract sparse seasonal patterns that are contained within dense seasons. For example, if the sparse recurrent instances were reflected in Monday-Friday 12, the summary data may include annotations such that if a Saturday-Sunday 15 sparse instance is extracted from within a Saturday-Sunday 12-20 dense season, the instance/sub-period Saturday-Sunday 15 is labelled as being sparse. The annotations provide the user with an opportunity to treat sparse/dense patterns differently. For certain use cases, further processing based on the distinction between sparse patterns and dense patterns may be performed. For instance, the deployment of additional resources in a datacenter may be contingent on whether a pattern is sparse or dense.

Figure 11:
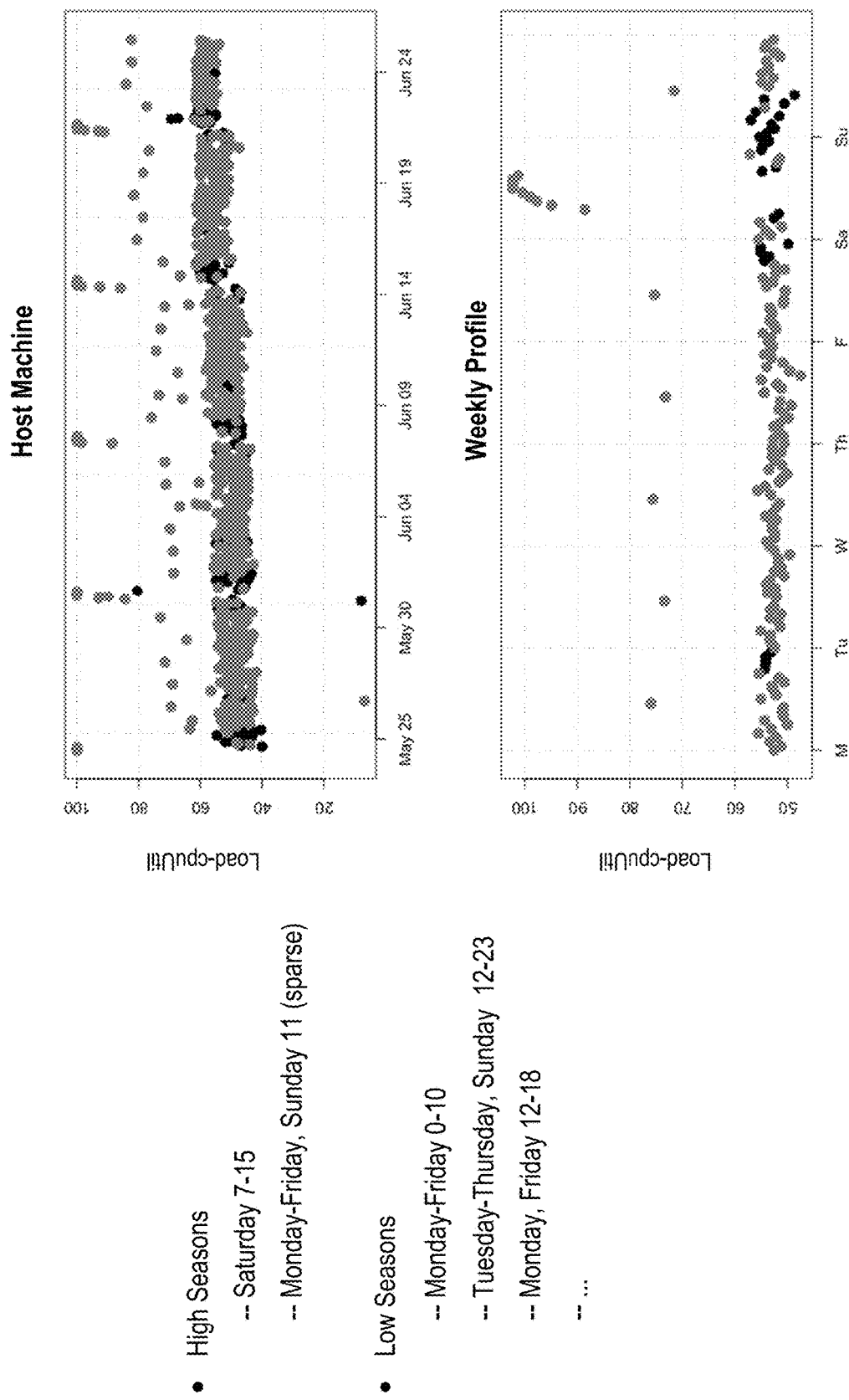
FIG. 11 illustrates an example summary where sparse patterns extracted and annotated separately from dense patterns.

FIG. 11 depicts an example summary where sparse patterns are extracted and annotated separately from dense patterns. As can be seen, two seasonal patterns are present in this time series. One is a small dense pattern, occurring early every Monday, while the second is a very large sparse pattern that emerges in the second half of the time series. Without separate treatment of sparse/dense features and no filtering, the selection methods may only pick up on sparse patterns since its magnitudes dominate the smaller dense pattern. Conversely if outliers were completely filtered, the selection methods would only pick up on the smaller, dense pattern. By providing detailed consideration of sparse and dense features, both patterns may be accurately detected and annotated.

Period Profile Generation Based on Seasonal Features

Figure 12:
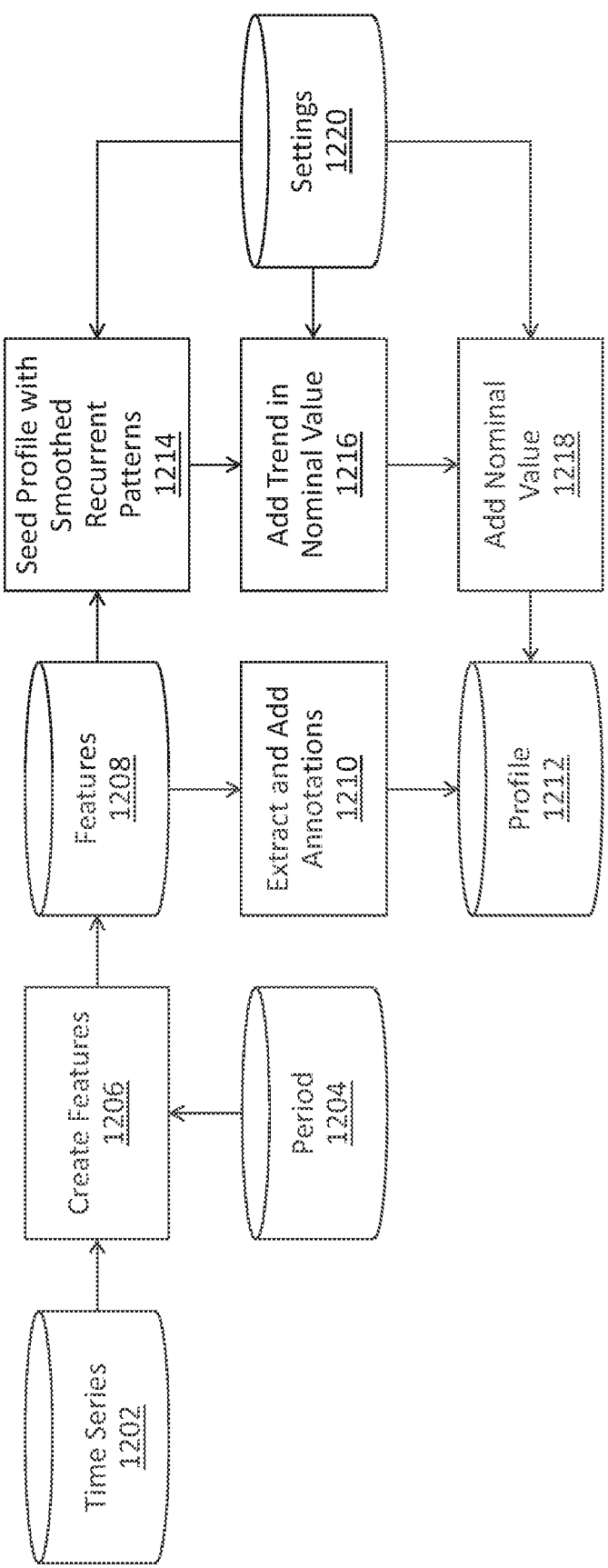
FIG. 12 illustrates an example process for generating period profiles based on seasonal characteristics.

FIG. 12 depicts an example process for generating a period profile. At block 1202, a time series is received and stored in volatile or non-volatile storage.

At block 1204, the process receives and stores data indicating a particular period of interest. The period may be specified by a user or automatically selected, depending on the particular implementation. For example, if the user is interested in viewing a profile for a prototypical week, then the user may input a one week interval. In another example, a user may specify a period of one month for a profile of a prototypical month or some other period of time.

At block 1206, the process generates features from a time series based on the specified period. In the context of weekly seasonality detection and characterization, the features include the set of time series used to select recurrent high/low patterns, the level terms of an Additive Holt-Winters (AHW) decomposition of a smoothed version of the time series, a trend in the data, seasonal factors, and classification data that identifies classes and/or sub-class to which instances of a season belong. In an embodiment, the classification data includes data indicating which hours are in high/low seasons and which hours are representative of sparse seasonal patterns or dense seasonal patterns. The set of time series received at this block may depend on whether a supervised or unsupervised approach is used to select recurrent highs and lows. For the supervised method, the set includes a first time series of sparse features and a second time series of dense features. For the unsupervised method, the set includes a single combined time series that is a composite of consistent/significant sparse features and dense features.

At block 1208, the feature that are generated for the time series are stored in volatile and/or non-volatile storage. As indicated above, the features may include the set of time series data used to select recurrent high/low patterns, the level terms that model a nominal value, the trend terms that model a trend in the time-series data, seasonal factors/components, and seasonal classifications. These features may be used to incrementally construct and annotate a period profile for the specified period, as described further below.

At block 1210, the period profile is initially seeded with a smoothed version of a time series that summarizes recurrent patterns. In an embodiment, seeding comprises combining (if there are more than one) the set of time series used to select recurrent high/low patterns via addition and then calculating the average value of each instance across all or a subset of periods removing a configurable number of extrema. Extrema may be removed to mitigate the impact of outliers. The statistical criteria used to define/identify extrema for removal may vary depending on the particular implementation. The determination may be made based in part on the magnitude of the value, the deviation from other values in the overall time series or from other values within the seasonal class, and/or some other statistical analysis.

Once the seeded profile has been generated, at block 1212, the trend of the nominal value is added. In the context of weekly seasonality detection and characterization, the trend rate may be calculated by fitting a line to the last week of level terms produced by the previously described AHW decomposition. To add the trend to the seeded profile, the trend rate may be multiplied by the temporal term relative to the period and the product added to the current profile sample. The end result of this step is the period profile that is a smoothed version of the recurrent patterns that is skewed by the calculated trend rate. While the trend rate may be calculated from the most recent period of data—thereby giving the user the most up to date summarization of the trend and make it easier for the user to understand what is happening now and what is likely to happen in the next period, in other embodiments, the trend rate may be calculated from longer and/or different time windows depending on the particular implementation.

At block 1214, the process adds a nominal value to every sample value in the period profile, moving the profile into a range of values that is representative of prototypical behavior. In the context of weekly seasonality detection and characterization, the block may comprise calculating the average of the most recent weeks level terms produced by the previously described AHW decomposition and then adding this value to the profile instances. Like the trend component, this step may be configured to use the most recent period of data to produce an output that is representative of where the time series is at the time of analysis. However, in other embodiments, different durations and/or different time windows may be used to calculate the nominal value.

Block 1216 stores, in volatile and/or non-volatile storage, settings used to generate the sample values of the period profile. The settings may be configurable by a user to allow control over how the period profile is calculated. Example parameters that may be stored/configured may include, without limitation,

- Parameters that control the initial seeding of the profile such as data identifying which set of time series to use, criteria for filtering extrema, and how many samples/how far back to go to average values.
- Parameters that control the derivation of a trend such as which time windows to use to calculate the trend, the duration of time to use when calculating the trend, an indication of whether to look for linear, exponential, logarithmic, or some other trend, etc.
- Parameters that control the derivation of a nominal value such as which time windows to use to calculate the nominal value and the duration of time to use when calculating the nominal value.

At block 1218, the adds annotations returned by the feature extraction process to the period profile. In the context of weekly seasonality detection and characterization, the process may label each hour as being in a high/low/neither season and indicating which high/low hours are in sparse/dense seasons.

At block 1220, the annotated period profile is stored in volatile and/or non-volatile storage. The annotations may be used to craft intuitive visualizations and capable analytics which use the profile as input(s), as described further below.

In the process above, the trend rate is calculated using the level terms of an AHW decomposition of a smoothed time series. Smoothing the time series before the AHW decomposition removes outliers. Analyzing the level terms of the AHW decomposition removes the impact of recurrent patterns and mitigates effects of level shifts since the level term has an effective memory and is only affected by level shifts over long periods. Put another way, the level term is a smooth estimate of the nominal value of a time series. Using the level term of the AHW decomposition to get the nominal value also has benefits similar to that of using AHW decomposition for the trend rate. The process mitigates the impacts of outliers, recurrent patterns, and level shifts when creating the sample values for a prototypical period.

Period Profile Visualizations and Analytics

Period profiles may be used to create robust representations of patterns in time-series data. The period profiles may be used to display or otherwise visualize various characteristics of seasonal patterns while mitigating the effects of outliers that tend to bias an individual segment result. The period profiles may also be useful to display or otherwise visualize variance within a seasonal periods even when the magnitude of inter-period trends exceeds the magnitude of the inner-period variance. For example, a weekly profile may be used to visualize typical recurrent high and low patterns within a week, which highs are sparse or dense in nature, which lows are sparse or dense in nature, and variance between values in the sparse and dense data. In another example, an accuracy buffer may be presented as a visualization, where the buffer represents a buffer around a signal that contains a threshold percentage of the data points.

The inclusion of annotations that describe if an instance is in a high/low season and, if it is, whether or not the season is sparse/dense is useful in creating intuitive visualizations and subsequent analytics. In the context of a weekly profile, for example, the visualization may facilitate segmenting out and analyzing work days in isolation. For a given work day, sample values may be displayed indicating the prototypical seasonal patterns that are encountered. For instance, the prototypical resource usage, such as the number of database logons, CPU load, memory consumption, connection requests, etc. may be displayed for each hour of interest for a given day or over several days in the week.

When sample values from different seasonal classes are overlaid on the same chart/graph or other visual, sample values from the different seasonal classes may be displayed with different visual features that identify to which seasonal class each sample value belongs. For example, the sample values that correspond to sparse highs may all be displayed in one color, dense highs another color, and lows as a third color. A key/legend that identifies a mapping between color and seasonal class may also be displayed on the chart. As another example, labels may be displayed adjacent to sparse profile samples whereas dense seasonal samples may remain unlabeled to reduce clutter. As another example, the size of the displayed points on a profile chart may differ between different seasonal classes.

Referring again to FIG. 11, the example weekly profile displays the days of the week along the x-axis and CPU long along the y-axis. Each sample value on the graph may be derived such as described above with respect to FIG. 12. The chart plots each of these sample values to show the typical CPU usage for either a specific or average host machine. As can be seen, a sparse high occurs Monday through Friday and Sunday at 11.

A user interface, such as a GUI, may control/configure the visualizations of a period profile for example, via a selection or deselection of one or more items in the legend or a checkbox associated therewith. For instance, a user may only wish to analyze sparse highs within a weekly profile. Upon request, the interface may display a visual of the sparse high values, while dense high values and values from other seasonal classes omitted from the visual. As another example, the interface may display a comparison of sparse highs to dense highs, removing the low values, or view some other combination of seasonal classes.

Inter-class comparisons may also be visualized using profile data. For example, a user may wish to analyze only data from the dense class and omit data from the sparse class. The dense class may be associated with a high sub-class and a low subclass, which may be distinguished using different visual characteristics such as previously described.

Various analytics may be performed using the profile data. For example, a user may query the profile to determine when the prototypical low or high point is in a month, week, day, etc. As another example, a user may query the profile to determine the variance between values classified as sparse highs. Other queries/analytics may be performed with the results returned based on how instances in the period profile have been classified.

Figure 13:
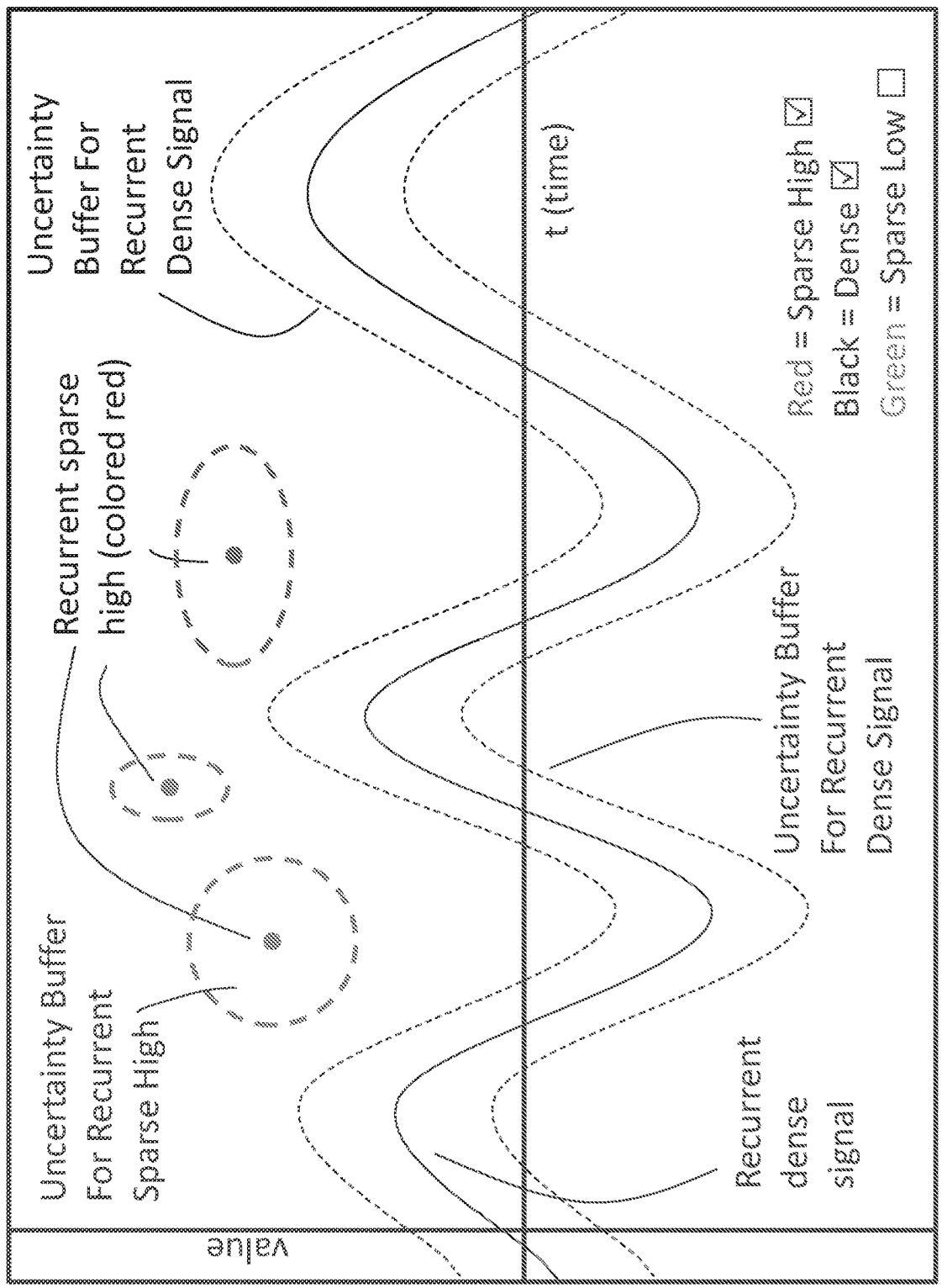
FIG. 13 illustrates an example weekly profile with a buffer of values.

FIG. 13 depicts an example graph with a visualization that indicates different classifications of seasonal patterns. The graph includes a legend that indicates three different classifications of recurrent seasonal patterns: sparse high data points are labeled in red, dense data points in black, and sparse low in green. As shown the sparse low is unchecked and thus the data points classified as sparse low are excluded from the visualization. Any of the items in the legend may be checked or unchecked to toggle the display. Uncertainty buffers are also drawn around the different signals. The uncertainty may vary as a function of time differently for different points that are classified the same. This is indicated by the circular shape around one sparse high data point and the different ovular shapes around the other two sparse data points. For example, a sparse high may vary significantly in terms of the time it occurs within the seasonal instance but not as significantly in terms of magnitude, leading to a horizontally stretched oval as shown. In another example, a sparse high may vary significantly in terms of magnitude but not as significantly in terms of the time it occurs within the seasonal instance, leading to a vertically stretched oval as shown.

Figure 14A:
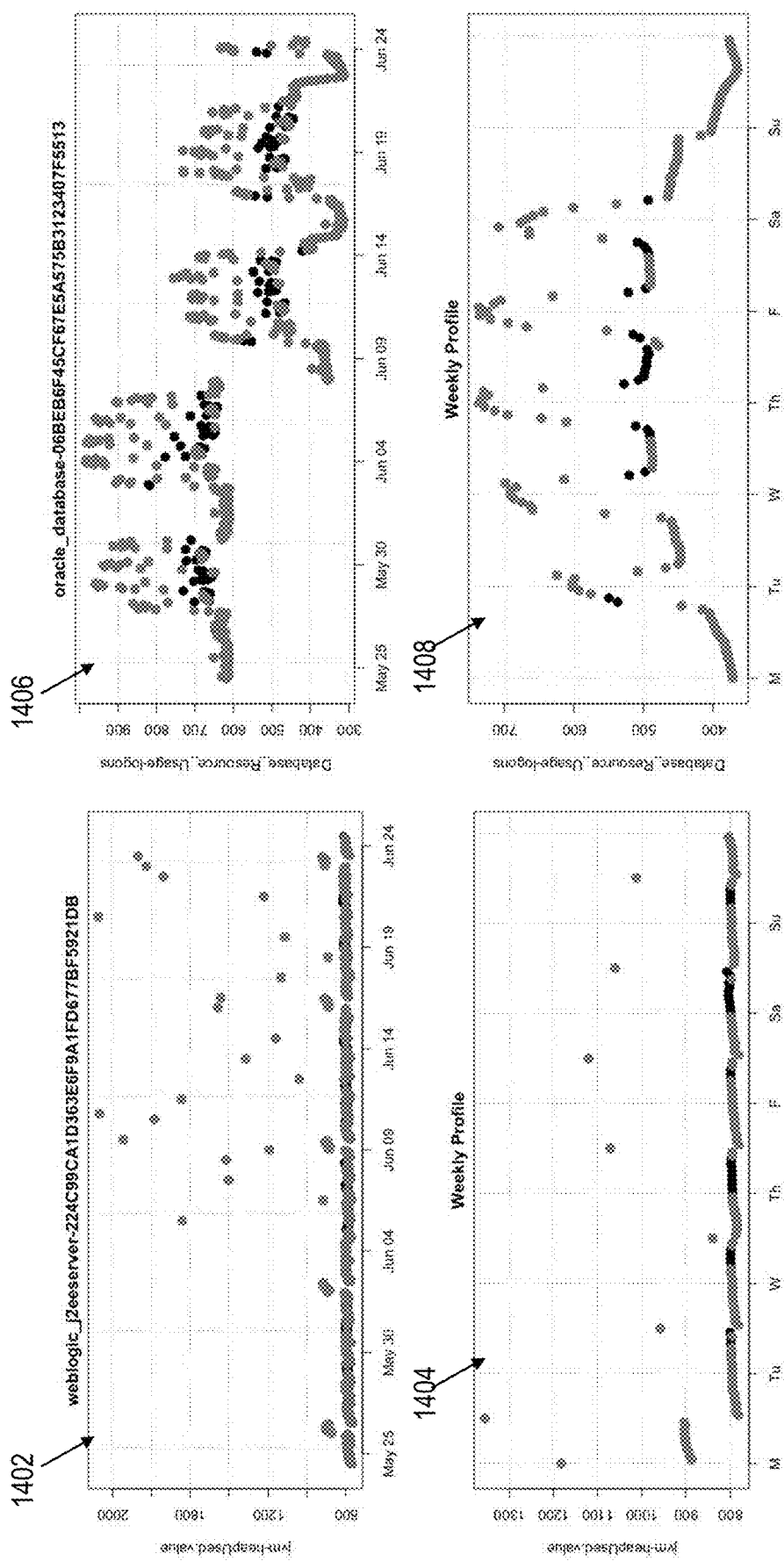
FIG. 14A illustrates example time-series datasets and corresponding weekly profiles.

FIG. 14A illustrates example time-series datasets and corresponding weekly profiles. Chart 1402 tracks heap usage in a WebLogic server over several weeks. Weekly profile 1404 is generated based on the time-series dataset depicted in chart 1402 to represent a prototypical week. A user may access weekly profile 1404 to view the expected high and low values of heap usage in the server as well as when the highs and lows occur in a prototypical week.

Chart 1406 tracks database logons in a database server over several weeks. Weekly profile 1408 is generated based on the time-series dataset depicted in chart 1406 to represent a prototypical week. A user may access weekly profile 1408 to view the expected high and low values of database logons as well as when the highs and lows occur in a prototypical week.

Figure 14B:
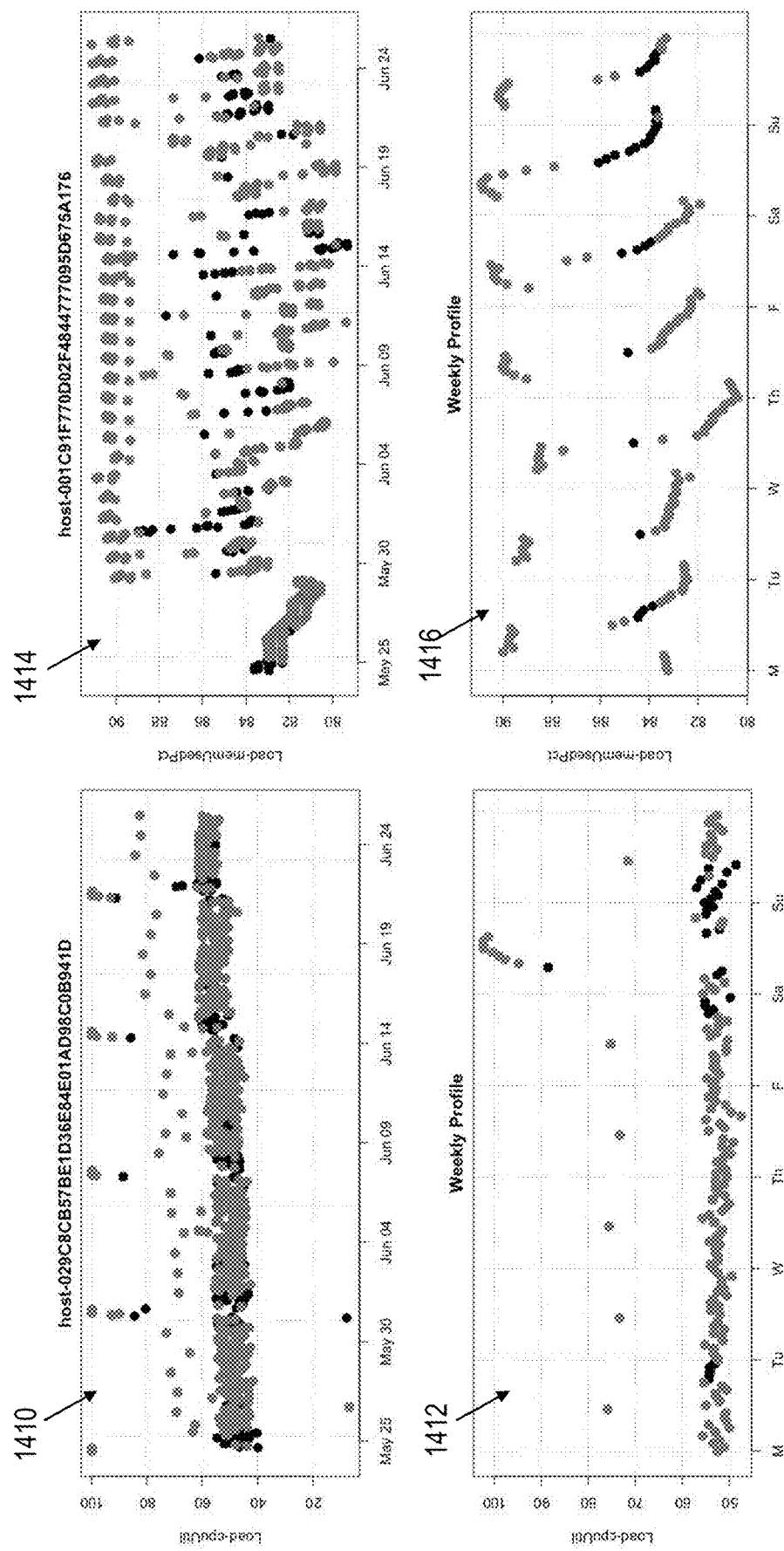
FIG. 14B illustrates example time-series datasets and corresponding weekly profiles.

FIG. 14B illustrates example time-series datasets and corresponding weekly profiles. Chart 1410 tracks CPU load in a target host over several weeks. Weekly profile 1412 is generated based on the time-series dataset depicted in chart 1410 to represent a prototypical week. A user may access weekly profile 1412 to view the expected high and low values of CPU load in the target host as well as when the highs and lows occur in a prototypical week Chart 1414 tracks memory usage in a target host over several weeks. Weekly profile 1416 is generated based on the time-series dataset depicted in chart 1414 to represent a prototypical week. A user may access weekly profile 1414 to view the expected high and low values of memory usage in the target host as well as when the highs and lows occur in a prototypical week.

In the example charts depicted n FIGS. 14A and 14B, data points may be displayed in different colors based on seasonal pattern classification. For example, red data points may be used to illustrate seasonal high periods, green to illustrate seasonal low periods, and black to identify points where there was insufficient evidence to support either the "high" or "low" classification. In other words, the black represents unclassified recurrent data. With the seasonal pattern classification techniques described above, the effects of extremas are mitigated on the sample values of the weekly profile chart. The techniques also mitigate the impact in the changes in nominal values and trends.

In one or more embodiments, the period profiles are incorporated into a calendaring interface. For example, a user may access a calendar application to view a prototypical month, week, and/or day of resource usage for a set of one or more targets. Sub-periods may be displayed in different colors and/or patterns, depending on seasonal pattern classification. For example, if seasonal highs for CPU usage of a set of one or more targets occurs Monday to Thursday from 8 a.m. to 4 p.m. in a prototypical week, these sub-periods may be displayed in a distinctive pattern or color to allow a user to quickly gauge peak usage hours. Other seasonal patterns (e.g., sparse highs, lows, etc.) may be displayed in different colors and/or patterns.

Figure 14C:
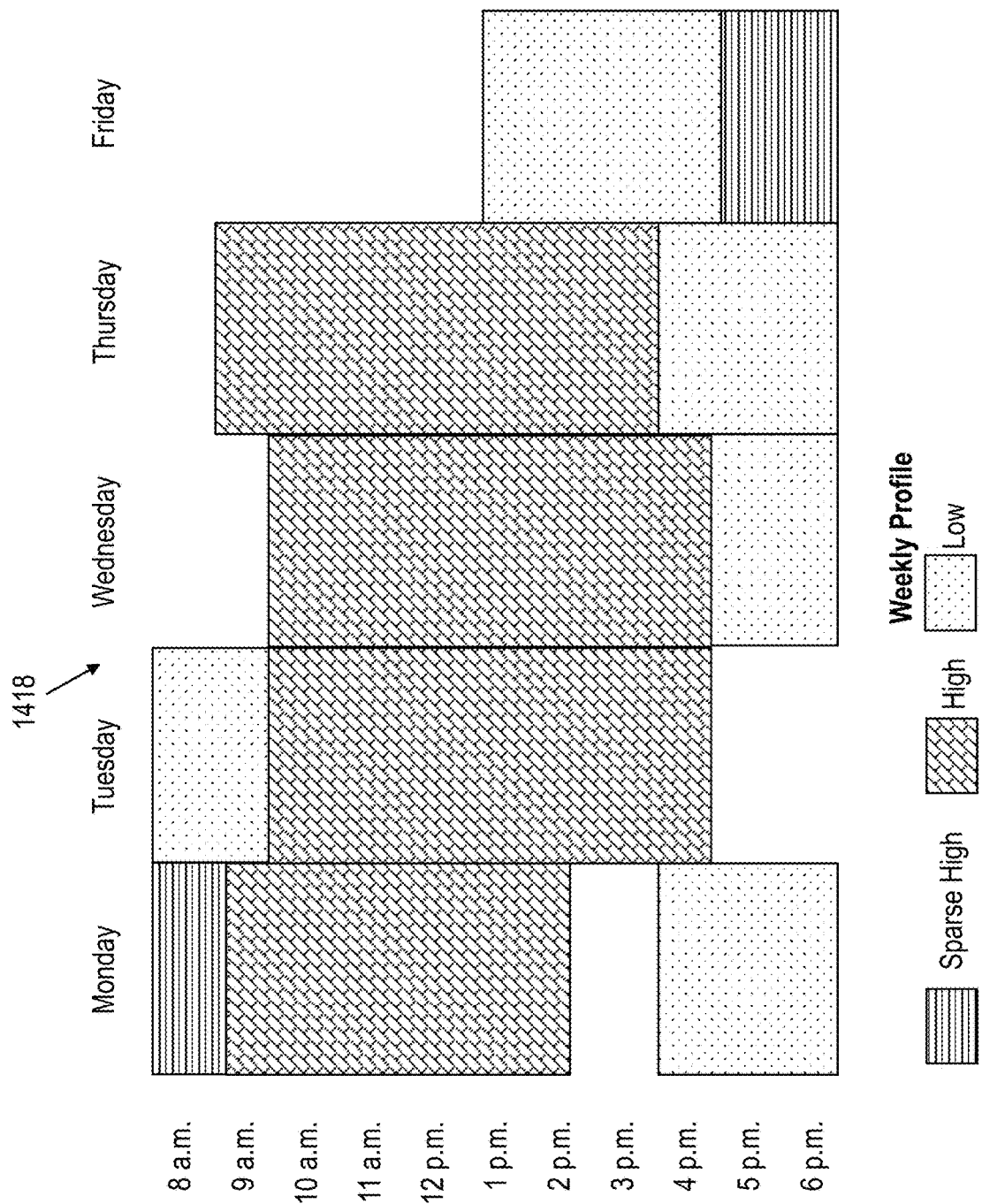
FIG. 14C illustrates an example weekly profile integrated into a calendaring interface.

FIG. 14C illustrates example weekly profile 1418 integrated into a calendaring interface. Weekly profile 1418 depicts different seasonal patterns on a calendar using different pattern fills. The seasonal patterns include sparse highs, highs, and lows. Hours where no seasonal patterns are detected may be left blank (or a different fill pattern/color may be used).

In one or more embodiments, a calendaring application provides an interface through which a user may interact with a period profile. For example, a user may select different blocks to view the prototypical values (e.g., CPU usage, memory usage, etc.) for the selected sub-period. If the user selects the 8 a.m. to 9 a.m. sparse high block, for instance, the calendaring application may cause the prototypical peak values for this selected period to be displayed. The user may select a different block of time (e.g., Monday from 9 a.m. to 2 p.m.) to see prototypical values for other sub-periods.

The calendaring application may allow a user to perform capacity planning operations based on an integrated period profile. For example, a user may determine that prototypical peak resource usage values for a particular block of time may warrant additional resources. The user may select the block of time and select an option to deploy additional resources. Based on the user's interactions through the calendaring interface, additional resources (e.g., target database servers, web servers, and/or other hosts) may be reallocated to support a particular application Microservice Profiles According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The profiling techniques described above may be encapsulated into a microservice, according to one or more embodiments. In other words, a microservice may trigger generation of a period profile (into the microservices manager for optional use by other plugged in applications, herein referred to as the "target" microservice), or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in application detects that a threshold is crossed. For example, a user may request a trigger into the microservices manager when the period profile detects a sparse high a dense high, or any other seasonal pattern.

In one embodiment, the trigger, when satisfied, might output time-series data for consumption by the target microservice. In another embodiment, the trigger, when satisfied, outputs a binary value indicating the trigger has been satisfied, or outputs the name of the field (for example, "West Server CPU Usage Period Profile") or other context information for which the trigger condition was satisfied. Additionally or alternatively, the target microservice may be connected to one or more other microservices such that the alert is input to the other microservices. Other microservices may perform responsive actions based on the predictive alert, including, but not limited to, deploying additional resources, adjusting system configurations, and/or generating GUIs.

Actions

In the same or a different embodiment, a plugged-in seasonality application may expose actions to the microservices manager. The exposed actions may receive, as input, data or an identification of a data object or location of data, that causes data to be moved into a data cloud. The data cloud may be a seasonality cloud, which automatically analyzes data for the detection and characterization of seasons. In another embodiment, the exposed actions may receive, as input, a request to generate periodic reports of seasonal patterns. The input might identify existing in-application reporting thresholds and whether to increase or decrease, or delete the threshold. In another embodiment, the input might request the seasonality application to create new in-application period profiles. The in-application alerts may trigger display of period profiles to the user while logged into the application, or may trigger alerts to the user using default or user-selected alert mechanisms available within the seasonality application itself, rather than through other applications plugged into the microservices manager. In yet another embodiment, the seasonality application may generate and provide a forecast based on input that identifies, locates, or provides historical data, and defines the extent or scope of the requested forecast (e.g., 3 hours out for the West Server CPU Usage dataset stored in the data cloud). The action, when triggered, may cause the seasonality application to provide, store, or display a forecast and/or period profile, for example, as a data model or as aggregate data that describes a data model.

Hardware Implementations

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
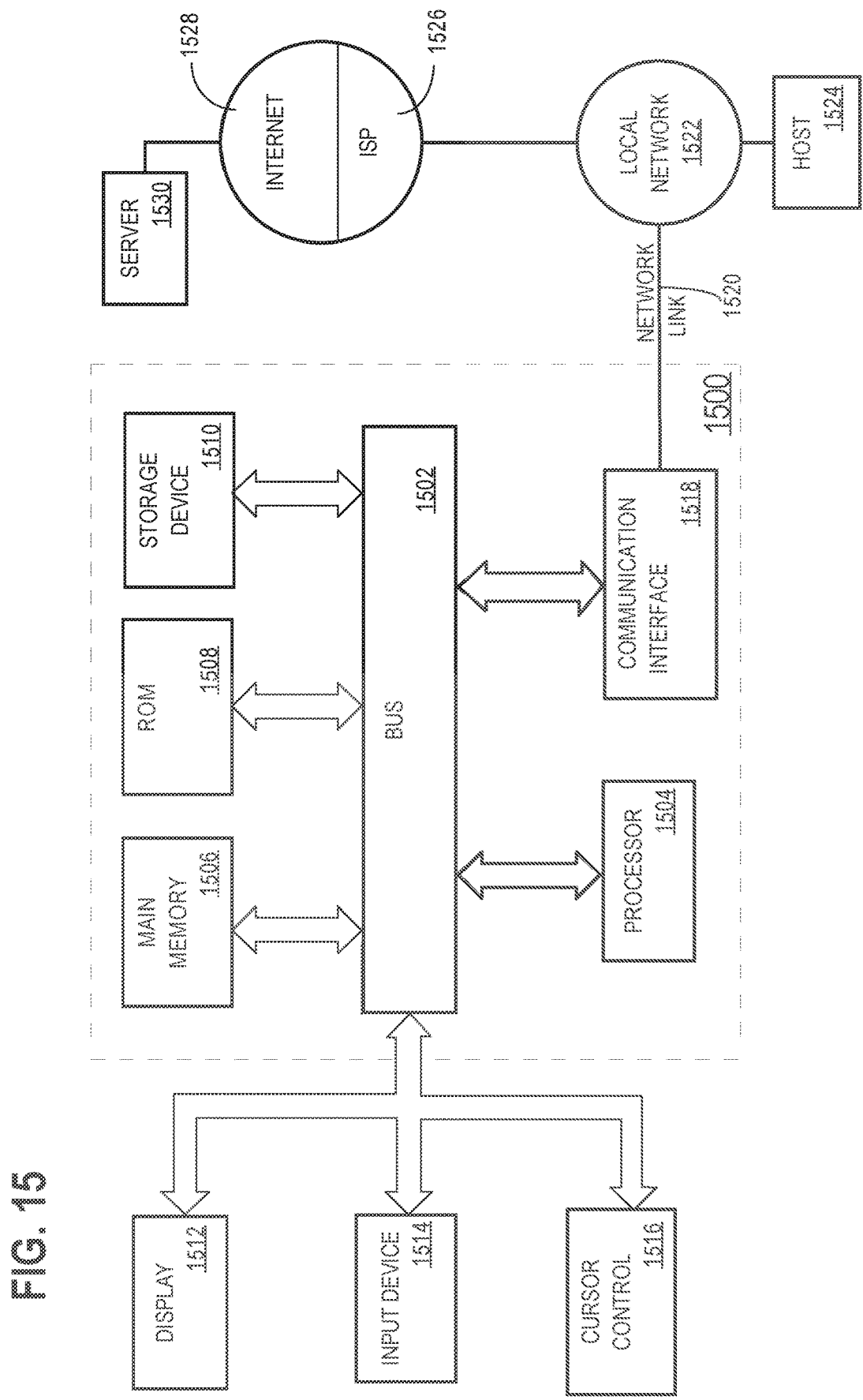
FIG. 15 is a block diagram that illustrates a computer system upon which some embodiments may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a liquid-crystal display (LCD) or a light-emitting diode (LED) display, for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

Cloud Computing Overview

The techniques described herein are implemented using one or more processing solutions, examples of which include distributed systems, clustered computing systems, and cloud computing systems. In an embodiment, one or more logic blocks described above are part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In a cloud-based environment, any part (or the whole of) the functionality described above may be controllable via an interface that is exposed at a cloud computing system.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a set of time series data that includes data spanning a plurality of time windows having a seasonal period;
   associating, based at least in part on the set of time series data, a first set of sub-periods of the seasonal period with a particular class of seasonal pattern;
   wherein, after associating the first set of sub-periods with the particular class of seasonal pattern, a second set of sub-periods is not associated with the particular class of seasonal pattern;
   generating a forecast based at least in part on which sub-periods of the seasonal period are associated with the particular class of seasonal pattern; and
   performing, by one or more computing devices, one or more seasonal-aware operations based at least in part on the forecast.

2. The method of claim 1, wherein the particular class of seasonal pattern is a sparse pattern that seasonally recurs within a noise signal extracted from the set of time series data; and wherein the one or more seasonal-aware operations account for the sparse pattern in the forecast.

3. The method of claim 2, further comprising associating the second set of sub-periods with a dense pattern that seasonally recurs when the noise signal is removed from the set of time series data; wherein the one or more seasonal-aware operations further account for the dense pattern in the forecast.

4. The method of claim 1, wherein the forecast projects resource utilization of at least one computing resource for a future window of time.

5. The method of claim 1, wherein the one or more seasonal-aware operations comprises determining whether to flag a high as anomalous based on the particular class of seasonal pattern in the forecast.

6. The method of claim 1, wherein the one or more seasonal-aware operations comprises scheduling at least one of a maintenance operation or a batch job on at least one computing resource based on which sub-periods of the seasonal period are associated with the particular class of seasonal pattern.

7. The method of claim 1, wherein the one or more seasonal-aware operations include performing at least one of consolidating or deploying computing resources based on which sub-periods of the seasonal period are associated with the particular class of seasonal pattern.

8. The method of claim 1, wherein associating, based at least in part on the set of time series data, a first set of sub-periods of the seasonal period with a particular class of seasonal pattern comprises applying a plurality of classifiers to a plurality of sub-periods within the seasonal period; and including sub-period from the plurality of sub-periods in the first set of sub-periods that have been associated with the particular class of seasonal pattern by a threshold number of classifiers.

9. The method of claim 1, wherein the second set of sub-periods is associated with a second class of seasonal pattern or is unclassified.

10. One or more non-transitory computer-readable media storing instructions, which, when executed by one or more hardware processors, cause performance of operations comprising:
receiving a set of time series data that includes data spanning a plurality of time windows having a seasonal period;
associating, based at least in part on the set of time series data, a first set of sub-periods of the seasonal period with a particular class of seasonal pattern;
wherein, after associating the first set of sub-periods with the particular class of seasonal pattern, a second set of sub-periods is not associated with the particular class of seasonal pattern;
generating a forecast based at least in part on which sub-periods of the seasonal period are associated with the particular class of seasonal pattern; and
performing, by one or more computing devices, one or more seasonal-aware operations based at least in part on the forecast.

11. The one or more non-transitory computer-readable media of claim 10, wherein the particular class of seasonal pattern is a sparse pattern that seasonally recurs within a noise signal extracted from the set of time series data; and wherein the one or more seasonal-aware operations account for the sparse pattern in the forecast.

12. The one or more non-transitory computer-readable media of claim 11, the operations further comprising associating the second set of sub-periods with a dense pattern that seasonally recurs when the noise signal is removed from the set of time series data; wherein the one or more seasonal-aware operations further account for the dense pattern in the forecast.

13. The one or more non-transitory computer-readable media of claim 10, wherein the forecast projects resource utilization of at least one computing resource for a future window of time.

14. The one or more non-transitory computer-readable media of claim 10, wherein the one or more seasonal-aware operations comprises determining whether to flag a high as anomalous based on the particular class of seasonal pattern in the forecast.

15. The one or more non-transitory computer-readable media of claim 10, wherein the one or more seasonal-aware operations comprises scheduling at least one of a maintenance operation or a batch job on at least one computing resource based on which sub-periods of the seasonal period are associated with the particular class of seasonal pattern.

16. The one or more non-transitory computer-readable media of claim 10, wherein the one or more seasonal-aware operations include performing at least one of consolidating or deploying computing resources based on which sub-periods of the seasonal period are associated with the particular class of seasonal pattern.

17. The one or more non-transitory computer-readable media of claim 10, wherein associating, based at least in part on the set of time series data, a first set of sub-periods of the seasonal period with a particular class of seasonal pattern comprises applying a plurality of classifiers to a plurality of sub-periods within the seasonal period; and including sub-period from the plurality of sub-periods in the first set of sub-periods that have been associated with the particular class of seasonal pattern by a threshold number of classifiers.

18. The one or more non-transitory computer-readable media of claim 10, wherein the second set of sub-periods is associated with a second class of seasonal pattern or is unclassified.

19. A system comprising:
one or more hardware processors;
one or more non-transitory computer-readable media storing instructions, which, when executed by one or more hardware processors, cause performance of operations comprising:
receiving a set of time series data that includes data spanning a plurality of time windows having a seasonal period;
associating, based at least in part on the set of time series data, a first set of sub-periods of the seasonal period with a particular class of seasonal pattern;
wherein, after associating the first set of sub-periods with the particular class of seasonal pattern, a second set of sub-periods is not associated with the particular class of seasonal pattern;
generating a forecast based at least in part on which sub-periods of the seasonal period are associated with the particular class of seasonal pattern; and
performing, by one or more computing devices, one or more seasonal-aware operations based at least in part on the forecast.

20. The system of claim 19, wherein the particular class of seasonal pattern is a sparse pattern that seasonally recurs within a noise signal extracted from the set of time series data; and wherein the one or more seasonal-aware operations account for the sparse pattern in the forecast.

* * * * *